United States Patent [19]

Ewan et al.

[11] 3,852,408

[45] Dec. 3, 1974

[54] PROCESS FOR THE REMOVAL OF SULFUR DIOXIDE FROM CARRIER GASES

[75] Inventors: Thomas K. Ewan, Daingerfield; Orvis L. Holland, Linden; Willis Leon Martin, Longview; James E. Hurse, Mt. Pleasant, all of Tex.

[73] Assignee: Lone Star Steel Company, Dallas, Tex.

[22] Filed: Sept. 21, 1972

[21] Appl. No.: 291,007

[52] U.S. Cl.............................. 423/242, 423/215.5
[51] Int. Cl.............................................. C01b 17/00
[58] Field of Search .......................... 423/242–244, 423/215.5; 23/271

[56] References Cited
UNITED STATES PATENTS

| | | | |
|---|---|---|---|
| 2,684,231 | 7/1954 | Pomykala | 423/242 |
| 2,914,941 | 12/1959 | Frenzl | 73/147 |
| 3,049,005 | 8/1962 | Frenzl | 73/147 |
| 3,285,711 | 11/1966 | Stanford | 423/242 |

*Primary Examiner*—Oscar R. Vertiz
*Assistant Examiner*—Gregory A. Heller
*Attorney, Agent, or Firm*—Donald E. Degling; James D. Bock

[57] ABSTRACT

A process is disclosed for the removal of sulfur dioxide from carrier gases formed in industrial processes such as as smelting, refining and power generating processes wherein the carrier gas is driven through an elongate mixing tube by means of a hot-water ejector drive in which finely atomized droplets of water in the form of a jet spray are intimately and turbulently mixed with the carrier gas in the mixing tube downstream of the hot-water ejector. An alkaline reagent is injected as a series of intense jets into the central portion of the jet spray emerging from the hot-water ejector and becomes intimately and turbulently mixed with the mixture of atomized droplets of water, steam and carrier gas which contains sulfur dioxide. The flow of the turbulent mixture through the mixing tube is regulated to provide retention time sufficient for the sulfur dioxide in the carrier gas to react with the alkaline reagent to form aqueous droplets of sulfur reaction products and for the droplets to grow to a size sufficient to permit removal by centrifugal means. In an alternative form of the invention, the carrier gases from which the sulfur dioxide has been substantially completely removed is further treated by driving the gases through a secondary mixing tube by means of a steam ejector and passing the turbulent mixture of gas, steam and water droplets through a condenser in which the condensible vapors are separated from the carrier gas. In the alternative form of the invention, alkaline reagents can be injected into the turbulent mixture contained in the secondary mixing tube to react with traces of sulfur dioxide or such odors and acidic gases as may then be present in the carrier gas.

26 Claims, 12 Drawing Figures

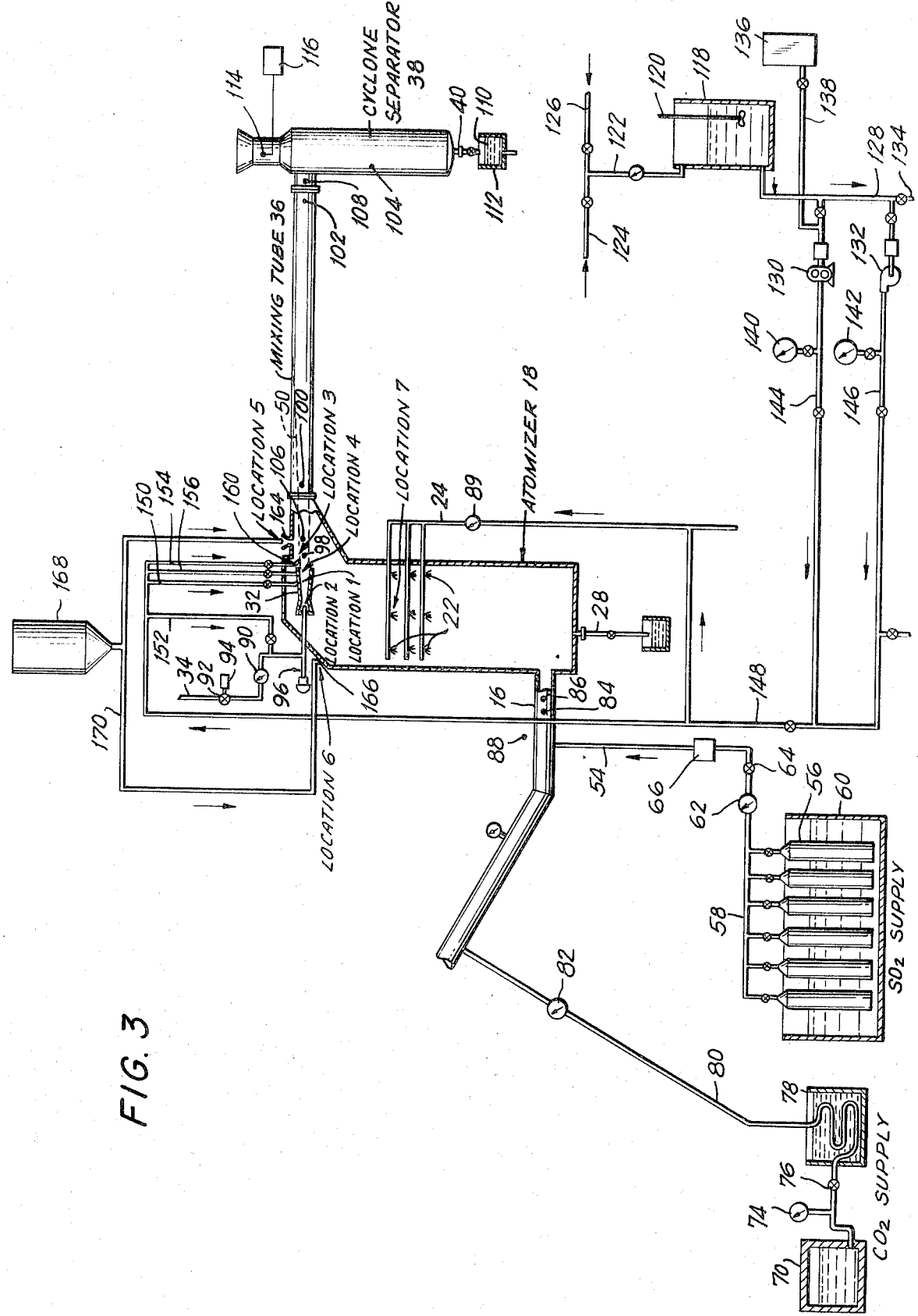

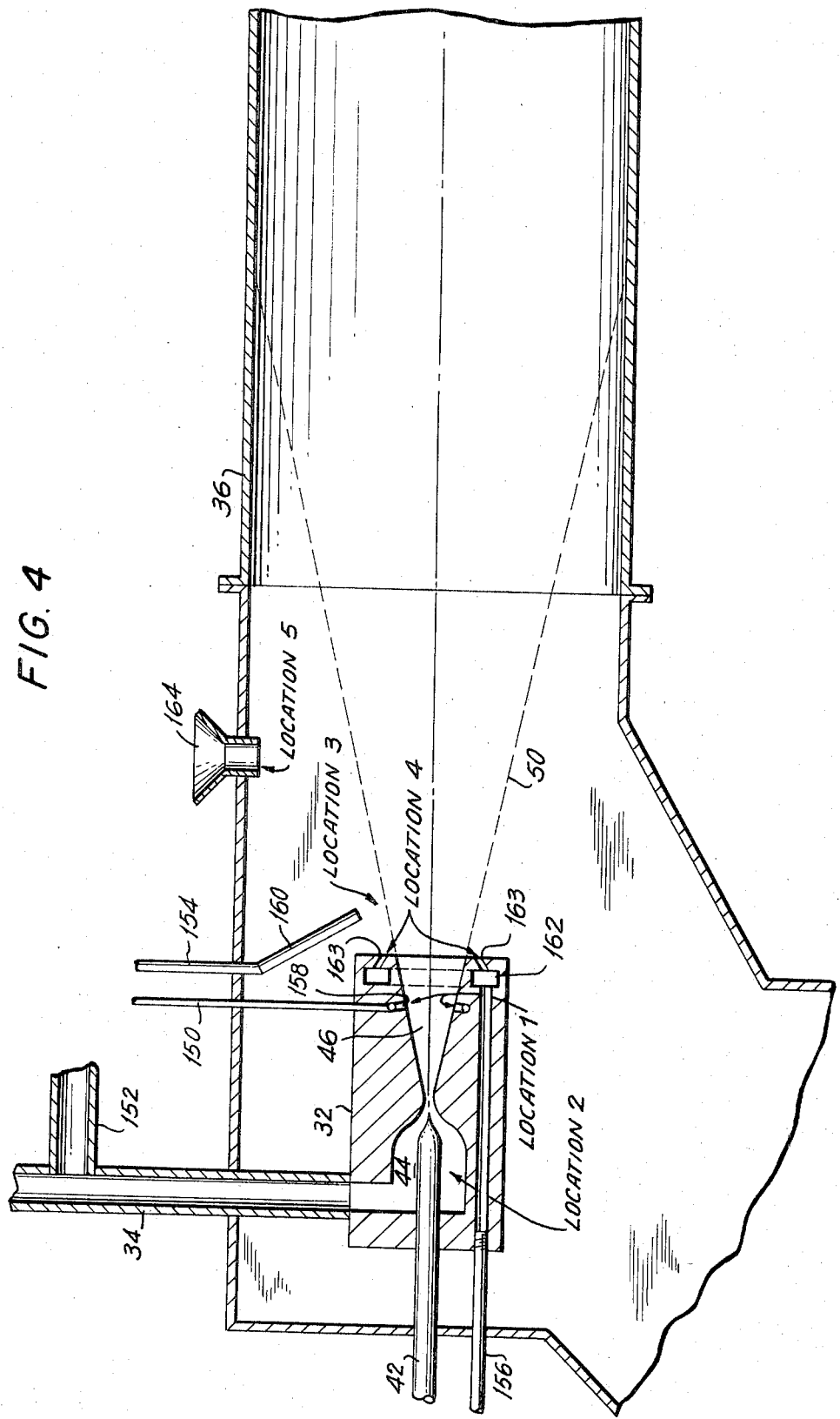

PROCESS FOR THE REMOVAL OF SULFUR DIOXIDE FROM CARRIER GASES

This invention relates to a method and apparatus for removing sulfur dioxide and condensible gases from carrier gases in industrial and chemical processes. The apparatus will also inherently remove particulates which may be contained in the carrier gases and is thus particularly adapted to cleaning the off-gases resulting from smelting and refining process and off-gases emitted by power generating plants.

Within the past few years, increasing attention has been directed to the treatment of the off-gases produced in industrial processes. Such off-gases may contain a large variety of contaminants including particulates of widely varying size and chemical composition; gases such as oxides of carbon, sulfur and nitrogen, hydrocarbons, aerosols, vapors, etc. While some of these contaminants, such as carbon dioxide, are relatively harmless, others, such as sulfur dioxide, are regarded as highly detrimental. In recognition of the adverse effect such substances have on the ecology, various governmental authorities have begun to set standards for the maximum emission levels which will be permitted under particular circumstances. In general, the standards have been set so as to take advantage of the latest techniques available for the removal of the contaminant under consideration, and it is reasonable to expect that these standards will be tightened as quickly as possible until acceptable levels for each contaminant are attained.

Sulfur dioxide $SO_2$) is one of the principal contaminants in many off-gases and its control has been studied intensively in connection with smelting and refining processes in the steel and copper industries and in the design of power generating plants. Each of these processes involves the combustion of fuels or the oxidation and reduction of ores containing sulfur which, at some point in the process, results in the formation of $SO_2$. In some cases, it is possible to substitute fuels such as natural gas having a low sulfur content for oil or coal to control the evoultion of $SO_2$, but such a substitution is often impractical for economic reasons even where a substitute fuel is available. It has been reported that the United States supply of low-sulfur fuel is quite limited. Also, a number of treatment processes have been suggested to remove sulfur prior to refining. Where, however, as in some copper smelting processes, sulfide ores are used, it is difficult to limit the amount of sulfur entering the process which may appear at some stage as $SO_2$.

As it is generally recognized that the presence of $SO_2$ in the off-gases of many industrial processes in quantities above acceptable emission limits cannot be avoided in practice, efforts have been directed toward its removal from the off-gases by chemical scrubbing. Among he processes which have been suggested are wet scrubbing with lime or limestone; dry injection of lime or limestone; ammonia scrubbing; scrubbing with magnesium oxide or zinc oxide; the use of molten carbonates, potassium formate or citrate; wet scrubbing with sodium hydroxide; and catalytic processes. Some of these processes result in the formation of sulfuric or nitric acid while in others elemental sulfur is produced which, theoretically, can be sold as by products to reduce the operating costs of the process. However, in many instances the quantities of acid produced by the removal process exceed the local market requirements and cause difficult storage and transportation problems. Also, the cost of producing elemental sulfur by a removal process frequently exceeds the cost of sulfur obtained directly from sulfur deposits. Thus, the production of by-products may not necessarily be advantageous. In general, the processes involving the use of lime or limestone do not result in a saleable by-product. In late 1971, the M. W. Kellogg Company submitted a report to the Environmental Protection Agency entitled "Evaluation of $SO_2$-Control Processes" (PB 204711), concerning the status of $SO_2$ control processes for large power plants and concluded that none of the 12 processes evaluated could be ranked as "commercially available" at the time the report was written.

While the chemical reactions necessary to the removal of $SO_2$ are well known and most of the common reagents have been utilized in various of the processes suggested by the prior art, a principal difficulty experienced by the prior art workers was to provide a proper environment in which the $SO_2$ gas can react quickly and completely with an appropriate reagent. Applicants believed that the key to a simple and efficient process would be to provide an environment in which a reagent could be atomized and then intimately mixed with the $SO_2$ gas so that the rate of the chemical reactions could be maximized. Applicants also recognized that it would be desirable, if possible, to combine the removal of $SO_2$ with the removal of particulates in the same apparatus to minimize the cost and complexity of the process and to provide a process that would be applicable to a wide range of contaminated gases.

It is, therefore, a principal object of the present invention to provide a simple and economic method and apparatus for removing $SO_2$ from carrier gases which occur in industrial and chemical processes and for simultaneously removing particulates that may also be contained in the carrier gases.

Another object of the present invention is to provide a process in which relatively inexpensive reagents are employed to remove $SO_2$ from carrier gases.

A further object of the invention is to provide a process for removing $SO_2$ from carrier gases in which the pH of the effluent liquids from the process is controlled to minimize corrosion problems.

Another object of the invention is to provide a process for removal of $SO_2$ from contaminated gases utilizing a minimum quantity of chemical reagents and water so as to minimize the effluent liquid treating problem.

Yet another object of the invention is to provide a process capable of contacting and removing, in addition to particulates and sulfur dioxide, odors and any condensible vapors, such as steam, which may be contained in the contaminated gases, or formed by the particulate and sulfur dioxide removal process.

Finally, it is an object of the present invention to provide an economical process for removing $SO_2$, particulates, odors and condensible vapors over a wide range of operating conditions but which can be controlled to give a predicted performance with a high degree of confidence.

In general, the process of the present invention comprises driving the contaminated carrier gas containing particulates and sulfur dioxide and produced, for example, in a smelting or refining process by a high-pressure hot-water ejector, injecting an alkaline chemical reagent or a combination of chemical reagents into the central portions of the turbulent mixture of steam and highly atomized water emitted from the hot-water ejector; intimately mixing the steam, atomized hot water and carrier gas under conditions of turbulent mixing and entraining the particulates and $SO_2$ molecules contained in the carrier gas with droplets of hot water and chemical reagents; regulating the flow of the turbulent mixture of steam, atomized droplets and carrier gas to provide retention time in the mixing tube sufficient for reaction of the chemical reagents with the $SO_2$ molecules to form aqueous droplets of sulfur-containing reaction products and particulate and for promoting the growth of the particulate-containing droplets and the droplets containing the $SO_2$ reaction products, separating the droplets from the cleaned carrier gas and, if desired, condensing any remaining steam and other condensible vapors. An auxiliary portion of the process includes the separation of the sulfur-containing products of reaction and particulates from the effluent of the process and in some cases, the regeneration of all or a portion of the chemical reagent.

The equipment used to perform the process of the present invention includes a hot-water ejector drive and chemical reagent supply system, a waste heat boiler or other equipment to provide water at high pressure and high temperature, an atomizer or conditioning chamber fitted with a chemical reagent supply system, a mixing tube associated with and proportioned to the hot-water ejector, a centrifugal separator, a steam ejector fitted with chemical reagent supply system and surface condenser for condensing steam and condensible vapors, if desired, and a water treatment system where required, to control the quality of the effluent liquid and to regenerate certain of the chemical reagents used in the process.

The present invention, as well as further objects and advantages thereof will be apparent from the following description and accompanying drawings in which:

FIG. 3 is a schematic drawing of the atomizer, driver, chemical injector, separator equipment and the auxiliary equipment utilized to test the process of the present invention;

FIG. 4 is a schematic representation of a nozzle, chemical injector and related mixing tube showing the principles of mixing which are employed;

Figure 1:
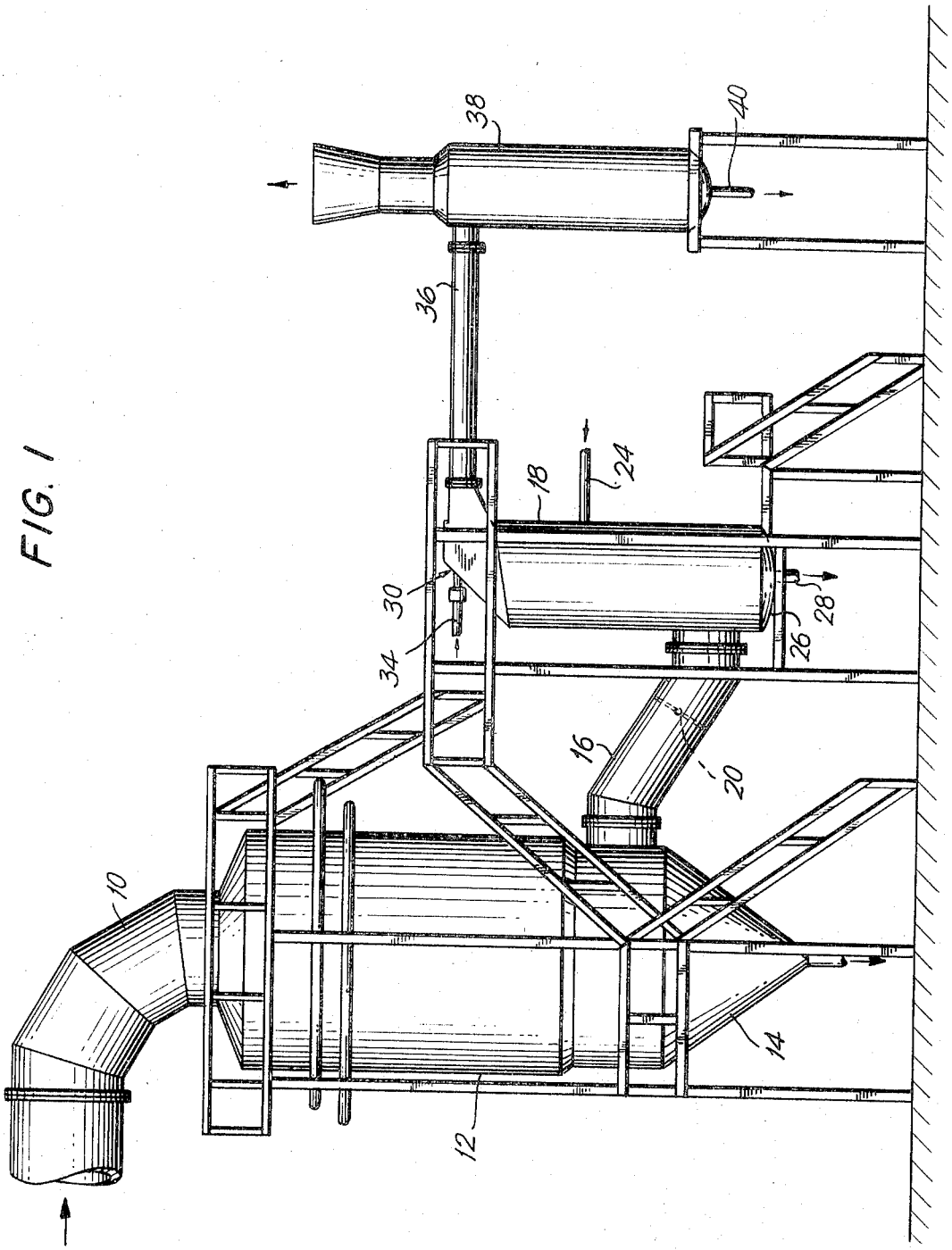
FIG. 1 is a general arrangement of the equipment used to practice the process of the present invention, including a waste heat boiler, atomizer chamber, hot-water ejector drive and chemical injector, mixing tube and twin cyclone separator.

The physical conditions necessary for the collection of particulates in various types of scrubbers have been well established. Large particulates can easily be separated from gas streams by inertial methods, i.e., changing the direction of the gas stream as in a centrifugal or cyclone separator. Mechanical methods such as venturi scrubbers which impact the particulates with a water spray or filters which interpose a mechanical barrier are also effective. Similarly, electrostatic forces can be used in the electrostatic precipitators. As the particulate size decreases, however, the collection efficiencies of these separators also decrease. When the diameter of the particulate is below about 1 micron (one micron equals one millionth of a meter), the collection efficiency of the conventional venturi scrubber and the electrostatic precipitator drops rapidly from over 95 percent to less than 20 percent. In steelmaking processes and other refining processes, particularly those in which pure oxygen is employed, a large portion of the particulate formed is of submicron size so that this decrease in efficiency is a matter of direct concern.

It is believed that the reason for the decrease in the collection efficiencies of the wet scrubber is generally related to the mass and relative velocity of the particulate. In a conventional wet scrubber, the capture of particulate is due principally to the collision of the particulate with droplets of water. When the particulate size decreases, its mass will also decrease and a point will be reached where the particulate can pass around the water droplet in a stream line. The ability of the particulates to be displaced around a water droplet depends also upon the momentum of the particle of water droplet which, in turn, is related to the relative velocity between the particle and the water droplet. Thus, it will be more difficult to displace a particle or water droplet having a relatively high velocity than one having a low relative velocity. Finally, if it be assumed that the particulate matter contained in a gas stream is distributed more or less uniformly throughout the stream, the probability of collision or impaction with water droplets is enhanced if a given mass of water is divided among a very large number of very small droplets rather than being concentrated in a relatively small number of large droplets. As the water droplets become smaller there is less opportunity for the incoming particle to be deflected by the streamlines of flow around the water droplet.

Summarizing with respect to the process of impaction for the collection of very small particulate, it is known that high collection efficiencies can be produced by providing (for a given mass of water) droplets of minimum size having a maximum velocity relative to the particulate. Insofar as the relative velocity is concerned, it is, of course, immaterial whether the droplets are accelerated relative to the particulate or vice versa and both methods are commonly used. It is also believed that maximum collection efficiencies are produced when the size of the particulate to be collected and the size of the water droplets are of the same order of magnitude.

In the well-known venturi wet scrubber, the particulate-containing gas is forced through a duct by fans or blowers and then accelerated by the converging portion of the venturi to a maximum velocity at the throat of the venturi where water is injected through jets of spray nozzles to impact against the gas stream. In contrast, in the venturi jet scrubber the reverse process occurs. Here water is ejected from the nozzle generally positioned along the axis of the venturi. The water jet, functioning as a water ejector, induces a flow of contaminated gas through the venturi by mixing and entraining the gas. The high velocity water droplets emerge from the nozzle drive and simultaneously mix with the gas in a process involving an exchange of momentum between the water droplets and the gas. In both general types of venturi scrubbers referred to, the collection efficiencies depend, in large part, upon the energy input to the system which, in turn, determines the size of the droplets and the relative velocity between the droplets and the particulate.

While impaction is believed to be the principal collection mechanism in wet scrubbers operating at ambient temperatures, other mechanisms can also exist. For example, if steam should be formed and mixed with the particulate-containing gas and then the mixture of steam and gas should be cooled, the steam will preferentially condense on the water droplets and particulate matter which consitute ideal nucleation sites.

As pointed out above, the efficiencies of the venturi scrubber can be increased by increasing the energy supplied to the scrubber. This can, of course, be accomplished either by accelerating the contaminated gas to a higher velocity or by increasing the energy of the water jetted into the scrubber. As water is substantially incompressible its energy can be increased most effectively by increasing its temperature. Of course, the water should not be allowed to boil or vaporize before passing through the nozzle as this would decrease the mass flow through the nozzle. Such boiling or vaporization behind the nozzle is readily prevented by an appropriate increase of the pressure of the water.

It has been demonstrated by Dr. Otto Frenzl in an article entitled "Flow of Vaporizing Water in Nozzles," published in Maschinenbau und Waermewirtschaft (1956), and in various subsequent publications that it is possible to design a water ejector drive using hot water in which a portion of the hot water passing through the nozzle, for example, 20 %, will flash into the vapor state as it is expanded in a diverging portion of the nozzle. The water flashing into the vapor state atomizes the remaining liquid water into a large number of extremely small droplets and accelerates them to a high velocity. This process, which produces turbulent mixing conditions, begins in the diverging portion of the nozzle and continues, in a properly designed ejector, for some distance beyond the nozzle exit until a large portion of the energy contained in the hot water has been transferred to the gas stream. Dr. Frenzl's hot-water drive was developed as an improvement over the steam ejector as a drive for wind tunnels (see U.S. Pat. No. 2,914,941 and 3,049,005), and has also been used as a drive for jet engine test facilities (see O. Frenzl, "Hot-Water Ejectors for Engine Test Facilities," J. Spacecraft, Vol. 1, No. 3, May–June 1964, pp. 333–338).

As the physical requirements for collection of small particulate in a wet scrubber are identical with the requirements for driving a gas by a hot-water ejector, i.e., large numbers of small water droplets having a high relative velocity with respect to the particulate in an environment where turbulent mixing conditions exist, it will be appreciated that a properly designed hot-water drive provides the basis for a highly efficient wet scrubber. Accordingly, applicants used a Frenzl hot-water drive in constructing the particulate cleaning system shown in FIG. 1 for the removal of particulate from the off-gas of open hearth furnaces and ore kilns. As a further development of this system resulted in the present invention, the particulate collection system will first be described.

Referring to FIG. 1, the hot flue gas from the open hearth or ore kiln is directed through a duct 10 and into a waste heat boiler 12. Preferably, the boiler is designed with vertical gas flow passages so that very large particulates carried from the furnace will drop out of the gas stream and be deposited in the collection chamber 14 at the base of the boiler 12. From the waste heat boiler 12, the flue gases are directed through duct 16 into an atomizer or conditioning chamber 18. A damper 20 is provided at the entrance of the atomizer chamber 18 to control the flow of gas therethrough and provide a resistance to start the hot-water drive as described hereafter. The atomizer chamber is fitted with a number of spray nozzles 22 connected to water supply manifold 24 (see FIG. 2). The water emitted from spray nozzles 22 need not be heated or specially treated and, in fact, raw water or normal tap water containing the usual minerals is desirable. The atomizer 18 performs the dual functions of further cooling the flue gas to reduce the volume thereof and of saturating the gas and particulate matter contained therein. During the upward passage of the gas through the atomizer 18, an additional portion of the particulates is captured by the water and falls to the bottom 26 of the atomizer 18. This water and particulate is removed as a slurry through the drain 28. Depending upon the size and mass of the particulate, as much as 80–95% may be removed in the atomizer 18, while the remainder of the particulate tends to become agglomerated and saturated with water (see Truitt and Davis, "The Function of condensing Steam in Aerosol Scrubbers," *American Industrial Hygiene Association Journal*, Vol. 32, No. 9, Sept. 1971, pp. 583–592).

Figure 4B:
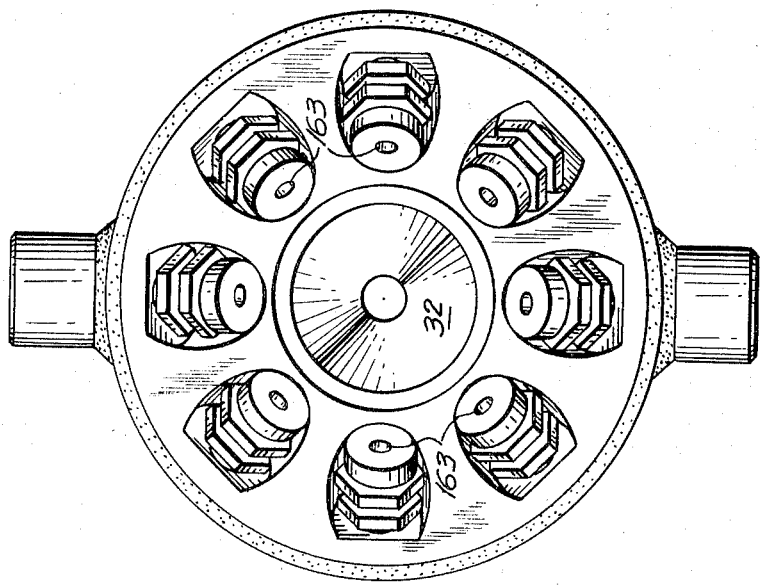
FIG. 4B is an end view of the nozzle and chemical injector shown in FIG. 4A.
Figure 4A:
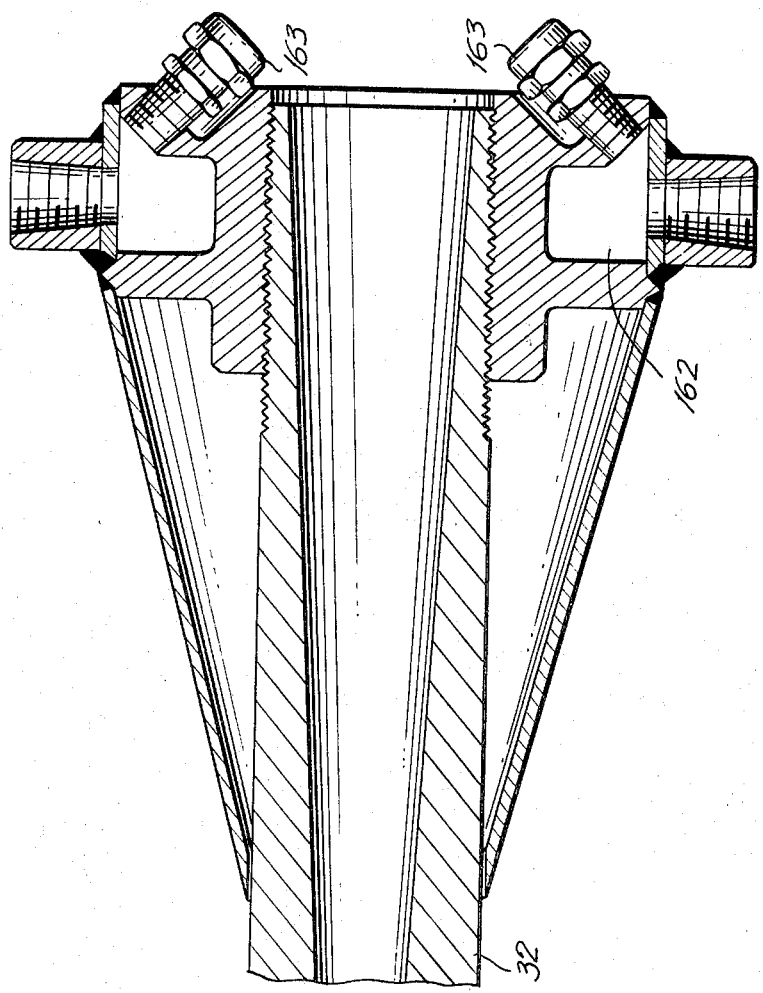
FIG. 4A is a fragmentary cross-sectional view of the exit end of the nozzle showing the preferred chemical injector.

The Frenzl hot-water drive 30 is positioned at the top of the atomizer 18. The drive comprises an adjustable nozzle 32 (FIG. 4) fed by hot water at high pressure through a line 34. The drive water is preferably heated by the heat extracted from the flue gases in the waste heat boiler 12, although supplemental heat may be provided if the flue gases do not contain sufficient heat. In a preferred embodiment of the apparatus it has been found that a nozzle having a throat diameter of 0.516 inches and driven by water at a temperature of about 450°F. and a pressure of about 400 psig. is sufficient to pump about 1100 pounds of flue gas per minute when located on the axis of an appropriate mixing tube 36, which, in the present example is a straight cylindrical tube 18 inches in diameter and about 16 ½ feet long. The mixing tube 36 communicates between the top of the atomizing chamber 18 and the tops of twin cyclone separators 38. In the present example, the cyclone separators have a diameter of about 4 feet and an effective height of about 16 feet. Cleaned gases leave the cyclones from a 30-inch diameter stack which extends axially into the cyclone separator body for a distance of about 6 ½ feet. A slurry comprising particulate matter and water is removed from the bottom of the cyclone separator through a drain 40. When required, the effluent from the atomizer 18 and the cyclones 38 can be treated and conditioned to remove the particulate and the treated water may be returned to the waste heat boiler 12 or to the atomizer 18 if desired.

FIG. 4 is a schematic drawing showing the adjustable nozzle 32 located along the axis of the mixing tube 36. The nozzle is of the converging-diverging type and is fitted with an adjusting needle 42 which, through lateral adjustment, varies the effective throat area of the nozzle. The nozzle thus operates at constant pressure throughout its full flow range.

In the region 44 behind the nozzle throat, the driving water is entirely in the liquid state at high temperature and pressure and contains a large quantity of stored thermal energy. In the diverging portion 46 of the nozzle, however, a lower pressure exists which causes a portion of the driving water to be exploded into the vapor state with a rapid release of energy. The virtual explosion of the high energy water into droplets does not occur at a single location within the nozzle but is a continuing process which occurs both within the diffuser portion of the nozzle and in the expanding generally cone-shaped mixture 50 of vapor and water exiting from the nozzle. The effect of this continuing process is to produce an increase in the number of water droplets and a decrease in the size of the droplets downstream from the nozzle until a point is reached where the energy contained in the water has been substantially dissipated to the mixture. As the generally cone-shaped mixture of vapor and water approaches the entry of the mixing tube 36, it begins to entrain and mix with the carrier gas to form a turbulent fog-like mixture of gas, vapor and water droplets. Simultaneously with the atomization of the water droplets, the process of impaction or collision occurs within the fog-like mixture exiting from the nozzle which tends to increase the size of the water droplets. In addition, some of the vapor may tend to condense, depending upon the local physical conditions. Finally, the processes of diffusion will affect at least the smallest droplets and particulate. The result of these various processes which are occurring simultaneously within the mixture of gas, vapor and water beyond the nozzle is to create a violently turbulent region in which intimate contact occurs between the gas, the gaseous or particulate contaminants contained therein and the vapor and water droplets to provide extremely efficient mixing conditions. However, these mixing conditions cannot be fully exploited unless the cone-shaped jet spray emerging from the nozzle becomes firmly attached to the mixing tube wall so as to provide a barrier against the flow of gas past the jet and cause the gas to be fully entrained within the jet spray. As full entrainment is also necessary to efficient pumping it will be appreciated that efficient pumping and mixing necessarily occur in a well designed hot-water ejector and mixing tube assembly. As a result of the processes occurring within the mixing chamber, any particulate contained in the gas will necessarily be captured by the water droplets. As the mixture of gas, vapor and droplets passes down the mixing tube the processes of impaction, collision, condensation and diffusion which tend to increase the droplet size will become predominant and, if a proper mixing tube length and flow velocity have been provided, the droplets will be of sufficiently large size to be separated in the twin cyclone separators 38.

In order for the hot-water drive to function efficiently as a pump it is essential, as both applicants and Dr. Frenzl have demonstrated, to cause the conical spray 50 exiting from the nozzle to engage the wall of the mixing tube 36 or in other words, to "hook up" to the mixing tube. Once hook up occurs, the action is analogous to continuous piston operation with suction upstream of the point of hook up and positive displacement of the pumped gas on the downstream side of the hook up point. Assuming that the nozzle, the mixing tube and the temperature and the pressure of the driving liquid have been properly proportioned, the hook up may be effected either by placing a resistance in the gas flow circuit behind the nozzle 32 as by closing the damper 20 in the duct 16 or by using an excess of driving water for the nozzle by opening the adjustable needle 42. When the damper 20 is closed, the action of the water jetted from the nozzle 32 tends to create a vacuum behind the nozzle which, it is believed, tends to increase the angle of the conical jet spray 50 until it strikes and firmly adheres to the wall of the mixing tube. Once hook up is obtained, the damper may be opened to permit the desired flow of gases through the duct 16. In the second method of causing the jet to hook up, an excess of water is expanded through the nozzle which, it is believed, also tends to increase the cone angle of the emerging water and steam mixture. Once the ejector has been hooked up the water flow may be reduced to approximately half of the starting flow without loss of pumping efficiency.

The hot-water drive described herein has been designed to operate at a weight ratio of driving water to driven gas ($\alpha$) of about 0.40, i.e. 4 pounds of water are required to drive each pound of carrier gas. In practice, it has been found that the system can operate efficiently at $\alpha$ ratios of between about 0.25 and 0.45. As the $\alpha$ ratio is decreased, the mass flow through the nozzle is decreased and less energy is available to pump the carrier gas and mix the gas and driving water. In general, reasons of economy dictate operations at the lowest $\alpha$ ratio consistent with adequate pumping. It has been found in a well-designed system that, so long as the ejector is operating efficiently as a pump, it will also effectively remove the particulate matter contained in the pumped gas. Where, however, the nozzle, mixing tube and separator are not properly proportioned, greater quantities of water will be required to pump the gas and lower removal efficiencies will be experienced (see U.S. Pat. No. 3,613,333, Col. 4, lines 42–45, for example).

Although it is believed that the main mixing occurs in the mixing tube near the nozzle end, turbulent flow exists throughout the mixing tube 36 and the increase in pressure towards the end of the mixing tube further enhances the mixing action. As a result, the small droplets formed in and adjacent to the nozzle tend to coalesce or agglomerate during their passage down the mixing tube to form relatively large droplets of a diameter on the order of 10 microns or more. As pointed out above, the increase in droplet size may be caused either by collisions with other droplets or by condensation of vapor or both. It will be appreciated that the maximum droplet size attainable will be a function of the time available for these processes to occur and this, in turn, is related to the length of the mixing tube and the flow velocity therein. In the present apparatus, the droplets have a short residence time in the mixing tube on the order of 100 milliseconds.

It is desirable for efficient centrifugal separation to provide a maximum entering velocity for the droplets and that the droplets have a maximum size, but it is apparent that these are conflicting requirements since a maximum droplet size implies a long mixing tube while a maximum droplet velocity implies a short mixing tube. In the present apparatus, these conflicting requirements are met by providing a mixing tube having a length sufficient to insure a droplet size of at least 10 microns and then utilizing twin small diameter cyclones which can effectively separate droplets of this size. It will be appreciated that cyclone separation efficiency increases as the cyclone diameter decreases and the entering velocity of the gas and liquid stream increases.

The apparatus described up to the present point has proven to be highly effective in the removal of particulate matter from the off-gases of open hearth furnaces and ore kilns. In tests run in accordance with the procedures specified by the Environmental Protection Agency, removal efficiencies in excess of 99 % were obtained.

As pointed out above, the chemical reactions relating to the removal of $SO_2$ using various reagents are well known. The reagents which are potentially most attractive in a large scale commercial process include lime, limestone, caustic soda, magnesia, ammonia, potassium permanganate, soda ash and other alkalis.

The reactions involving caustic soda (sodium hydroxide, Na OH) are:

$$2\ Na\ OH + SO_2 \rightarrow Na_2\ SO_3 + H_2O \quad (1)$$

and $$Na\ OH + SO_2 \rightarrow Na\ HSO_3 \quad (2)$$

In accordance with equation (1) and based on the molecular weights of the reactants, 80 parts by weight of sodium hydroxide react with 64 parts by weight of sulfur dioxide. Thus, it requires 1.25 pounds of sodium hydroxide to react with and remove one pound of $SO_2$. According to equation (2), 40 parts by weight of sodium hydroxide react with 64 parts by weight of sulfur dioxide so that 0.625 pounds of sodium hydroxide are required to react with and remove one pound of $SO_2$. The reactions described by equations (1) and (2) occur generally at the same time and an equilibrium exists between them. When an insufficient amount of caustic is provided, the bisulfite reaction (Equation (2) is favored while in the presence of excess caustic any bisulfite will be further reacted to form sodium sulfite. Although from considerations of economy of chemical reactants it would be desirable to promote the bisulfite reaction, the presence of the bisulfite may result in corrosion problems.

Like the reactions involving caustic soda, there are two reactions between soda ash (sodium carbonate) and $SO_2$:

$$Na\ CO_3 + SO_2 \rightarrow Na_2\ SO_3 + CO_2 \quad (3)$$

$$Na_2\ CO_3 + 2SO_2 + H_2O \rightarrow 2\ Na\ HSO_3 + CO_2 \quad (4)$$

In accordance with equation (3) and based on the molecular weights of the reactants, 106 parts by weight of sodium carbonate react with 64 parts by weight of sulfur dioxide. Thus, it requires 1.66 pounds of sodium carbonate to react with and remove one pound of $SO_2$. According to equation (4), 106 parts by weight of sodium carbonate react with 128 parts by weight of sulfur dioxide so that 0.83 pounds of sodium carbonate are required to react with and remove one pound of $SO_2$. Again, the reactions described by equations (3) and (4) exist together and in equilibrium and a deficiency of sodium carbonate favors the bisulfite reaction while an excess favors the sulfite reactions.

The reaction with lime as slaked lime (calcium hydroxide) is:

$$Ca\ (OH)_2 + SO_2 \rightarrow CaSO_3 + H_2O \quad (5)$$

In this reaction, 74 parts by weight of calcium hydroxide react with 64 parts by weight of $SO_2$ so that it requires 1.15 pounds of calcium hydroxide to react with and remove 1 pound of $SO_2$. While it is theoretically possible to attain a bisulfite reaction, lime is ordinarily provided in excess quantities so that there is little likelihood that the reaction products will contain the bisulfite. Lime may also be provided as dry lime (CaO) which, when mixed with water to form a slurry will react with the water to form the hydroxide (Ca (OH)$_2$). However, the contaminated gases, particularly those resulting from a combustion process will ordinarily contain considerable quantities of carbon dioxide ($CO_2$). In this circumstance, the following reactions will occur:

$$Ca\ (OH)_2 + CO_2 \rightarrow Ca\ CO_3 + H_2O \quad (6)$$

$$Ca\ CO_3 + CO_2 + H_2O \rightarrow Ca\ (H\ CO_3)_2 \quad (7)$$

$$HCO_3)_2 + SO_2 \rightarrow Ca\ SO_3 + H_2O + 2CO_2 \quad (8)$$

While the net reaction represented by the sum of equations (6), (7) and (8) is identical with equation (95), of the intermediate reactions, including the formation of calcium carbonate and calcium bicarbonate, suggest that the removal efficiency for $SO_2$ may be somewhat decreased where, as here, the time for reaction is limited by the dynamics of the equipment utilized in the process.

From equations (7) and (8), it might be thought that limestone (calcium carbonate) would be preferable to slaked lime (calcium hydroxide) as a reactant where carbon dioxide is present particularly in view of the low cost and ready availability of limestone. However, the calcium carbonate formed according to equation (6) and which reacts according to equation (7) will be in a substantially molecular form which is capable of rapid chemical reaction. Limestone, on the other hand, is commercially available only as a coarse aggregate and even when ground to 325 mesh or below is not sufficiently fine so as to be capable of rapid reaction. As will be shown below, limestone is not well adapted to the present process.

Recognizing that the apparatus shown in FIG. 1 was effective for particulate removal principally because the driving power of the hot-water ejector necessarily created an extremely effective mixing action between the drive water and the driven gas and the particulates contained therein, applicants believed that, if this mixing environment could be utilized as a reaction chamber, effective sulfur dioxide removal could be accomplished simultaneously with particulate removal with a minimum amount of chemical reagents and little additional equipment. To determine whether or not this new concept for $SO_2$ removal was viable, applicants instrumented the particulate removal apparatus as shown schematically in FIG. 3 and provided means for the introduction of various chemical reagents at several locations in the apparatus, also as shown in FIGS. 3 and 4.

FIG. 3 shows in schematic form part of the apparatus of FIG. 1 beginning with the inlet duct 16 to the atomizer chamber 18 and ending with the cyclone separator 38. Similar parts in the two figures bear corresponding identification numerals. The apparatus selected for the test work described herein was connected to treat the effluent air from an ore kiln cooler. As this effluent contained substantially no sulfur dioxide or carbon dioxide it was possible, by adding measured quantities of these agents, to determine with precision the effect of the several chemical reactants and the manner of their injection into the system.

Referring now to FIG. 3, $SO_2$ was injected into the atomizer inlet duct 16 through a conduit 54 communicating with a bank of cylinders 56 containing liquid $SO_2$ manifolded at 58 to provide a supply of gaseous $SO_2$. The cylinders 56 of liquid $SO_2$ were maintained in a warm water tank 60 to facilitate the flow of $SO_2$. The manifold pressure of the $SO_2$ was indicated by a pressure gage 62 located upstream of the $SO_2$ control valve 64. The flow of $SO_2$ was controlled by maintaining a constant differential pressure across the $SO_2$ injection meter 66 as indicated by a differential manometer. An independent check on the $SO_2$ was provided by an $SO_2$ emission monitor 116 placed in the cyclone discharge stack 38 and calibrated to show the $SO_2$ input in parts per million of the gas flow.

In a similar manner, provision was made to inject measured amounts of carbon dioxide ($CO_2$) into atomizer inlet duct 16. The $CO_2$ was obtained from a refrigerated storage tank 70 containing $CO_2$ in liquid form. The pressure of the $CO_2$ was indicated by a gage 74 located upstream from a control valve 76. The $CO_2$ was passed through a hot-water bath heat exchanger 78 and then introduced into the atomizer inlet duct 16 through conduit 80. The flow of gaseous $CO_2$ in the conduit 80 was measured by a flow-meter 82 and controlled by valve 76.

To provide a complete control of the operating parameters and a record of the ambient conditions, the following instrumentation was provided: An inlet gas meter 84 was located in the duct 16 to measure the stagnation and static pressures of the inlet gas within the inlet duct 16 and the inlet gas temperature was indicated by a thermocouple 86. The ambient atmospheric pressure was measured with a barometer 88 located adjacent the inlet duct 16. The pressure of the spray water introduced into the atomizer 18 was measured by a gage 89 located in the atomizer water supply manifold 24. The condition of the nozzle driving water was determined by instruments placed in the hot water supply line 34 just upstream of the nozzle 32. These instruments included a pressure gage 90, a thermocouple 92 and a flowmeter 94. The operating position of the nozzle adjusting needle 42, measured as displacement in inches from the closed position was shown by a meter 96.

Significant pressures in the system were shown by pressure gages 98, 100, 102 and 104 located, respectively, downstream of the nozzle, at the mixing tube entrance; at the mixing tube exit; and within the cyclone separator. Corresponding temperatures within the system were measured by thermocouples 106, 108 located, respectively, downstream of the nozzle and at the end of the mixing tube 36.

At the drain 40 of the cyclone separator 38, the temperature of the slurry was measured by a thermometer 110 and the time required for the slurry to fill a standard 55 gallon barrel 112 was recorded. The quantity of $SO_2$ contained in the slurry was determined by chemical analysis and calculated in terms of pounds of $SO_2$ collected per minute for comparison with emission monitor and $SO_2$ differential manometer pressure data.

At the stack of the cyclone separator 38 $SO_2$ sampling taps 114 were provided for an $SO_2$ measuring meter 116 calibrated to measure the $SO_2$ content of the gas exiting from the cyclone separator 38 in parts per million by volume.

In order to establish the validity of applicants' concept that it was necessary to initimately mix the reactants with the atomized driving water and $SO_2$-containing carrier gas, applicants tested a variety of chemical reagents as powders, slurries and solutions and injected into the apparatus at several locations where a variation in the mixing efficiency and reaction rate might be experienced. The reagents tested included lime, limestone and oyster shells injected as dry powders; lime and limestone injected as a wet slurry; caustic soda and soda ash injected as a solution; and mixtures of lime and caustic soda injected as a wet slurry. The points of injection included direct injection into the nozzle (Location 1); direct injection into the nozzle driving water (Location 2); delivery to the exterior of the jet spray at the end of the nozzle (Location 3); injection into the interior of the jet spray at the end of the nozzle (Location 4); dry delivery to the jet spray beyond the nozzle (Location 5); dry delivery to the top of the atomizer before the nozzle (Location 6) and injection to the atomizer spray water (Location 7).

Referring again to FIG. 3, the chemical reagent delivery system comprises a mixing tank 118 provided with a mechanical mixer 120 and metered water conduit 122 communicating with a valved hot-water line 124 and a valved cold-water line 126. The outlet of the mixing tank 118 communicates alternatively through a valved conduit 128 to a chemical pump 130, a slurry pump 132 and a drain 134. Where reagent mixing is not required, a valved reagent tank 136 may be connected through a conduit 138 to the conduit 128 adjacent the intake of the chemical pump 130. Pressure gages 140, 142 are provided in the outlet lines 144, 146 connected, respectively, to the chemical pump 130 and the slurry pump 132. Outlet lines 144 and 146 may conveniently be joined to form a single chemical reagent supply line 148 which communicates alternatively through valved inlet conduits 150, 152, 154 and 156.

Inlet conduit 150 communicates with chemical reagent Location 1 referred to above. Location 1 comprises two ports 158 formed in the expanding or diffuser portion of the hot-water ejector nozzle 32 and located 180° apart about two inches from the end of the nozzle. As shown in FIG. 4, the ports 158 are formed with smooth edges to minimize disturbance to the flow of fluid through the nozzle 32. The chemical reagent injected at this point is injected at a direction which is approximately normal to the flow through the nozzle.

Inlet conduit 152 communicates directly with the nozzle driving water supply line 34 just behind the nozzle 32. Thus, chemical reagent Location 2 referred to above is the nozzle hot water supply 34. As hot water is supplied to the nozzle at temperatures in the range of 450°F. and pressures in the range of 400 psig., it will be appreciated that difficulites may be experienced in injecting chemical reagents at this point. Additionally, where calcium-based reagents such as lime or limestone are used, formidable scaling problems can be expected which may interfere with the performance of the nozzle and, where sodium-based reagents such as soda ash and caustic soda are used, corrosion problems may be experienced. It has been reported in connection with venturi jet scrubbers manufactured by Koertrol Corporation (Type 7014) that when operated with a weak caustic solution at ambient temperatures, good removal of SO₂ was experienced.

Inlet conduit 154 communicates with chemical reagent Location 3 which comprises a single conduit 160 positioned above the exit end of the nozzle 32 so that the chemical reagent can be delivered to the exterior of the conical jet 50 emerging from the nozzle 32 at such an intensity that the chemical reagent does not penetrate into the central portion of the conical jet but remains essentially on the surface thereof. Location 3 was intentionally designed to deliver the chemical reagent to the exterior of the conical jet in contrast to a delivery within the jet.

Inlet conduit 156 communicates with an annular manifold 162 (FIG. 4A) located at or near the exit end of the nozzle 32 (Location 4). A number of circumferentially disposed orifices or nozzles 163 (FIGS. 4A and 4B) are formed in the manifold 162 so as to deliver the chemical reagent as a series of intense jets into the central portion of, and generally in the direction of movement of the conical jet 50 emerging from the nozzle 32 at an acute angle to, but not necessarily intersecting, the axis of the nozzle 32. Location 4, in contrast with Location 3, was intentionally designed to inject the chemical reagent into the central portion of the conical jet 50 emerging from the nozzle 32. It will be appreciated that although the chemical reagent at Locations 3 and 4 is delivered to approximately the same portion of the conical jet 50 emerging from the nozzle, the reagent from Location 3 is delivered at low intensity to the outer surface of the conical jet and does not initially penetrate into the conical jet while the reagent from Location 4 is delivered at high intensity into the central portion of the jet with a momentum which adds to the driving power of the jet.

Locations 5 and 6 constitute, respectively, ports 164 and 166 located in the top of the atomizer chamber 18 along the axis of the Frenzl hot-water drive unit 30 downstream (Location 5) and upstream (Location 6) of the nozzle. These locations were designed specifically for the introduction of dry powdered chemical reagents such as lime, limestone and oyster shells. The injection system comprises a reagent storage bin 168 fitted at the bottom with an appropriate metering device and a conduit 170 communicating, respectively, with port 164 and port 166. As a negative pressure will exist within the atomizer chamber, it would be possible to utilize the vacuum to draw powdered reagents into the atomizer although it will be appreciated that there are mechanical problems associated with the delivery of powdered reagents that are ordinarily not experienced with the delivery of liquid reagents. Location 5 (downstream of the nozzle) permits a comparison between a dry reagent acting on the surface of the conical jet stream and a liquid reagent similarly acting on the surface of the conical jet stream (Location 3). Location 6 (port 166) was positioned so that powdered material which did not become entrained in the gas flow would fall through the atomizer spray and react within the atomizer chamber 18.

Location 7 involved the introduction of chemical reagents into the atomizer chamber 18 via the atomizer water supply 24 and spray nozzles 22. As the mixing conditions within the atomizer chamber 18 are less effective than those in the Frenzl drive, it was believed that the SO₂ removal efficiency would be correspondingly lower. Nevertheless, the addition of a basic material in the atomizer presents the possibility of a two-stage SO₂ removal process together with a control of the pH in the atomizer portion of the apparatus.

TABLE I

NaOH Injection

| Run No. | Air-flow Lbs/Min | Driver Water Lbs/Sec | Alpha Lbs. H₂O LB. Air | SO₂ Injected Lb./Min | SO₂ Injected PPM (Vol) | Chemical Injected Location | Chemical Injected %Conc. | Chemical Injected GPM | SO₂ Out PPM (Vol) | Equiv. Ratio | Overall Effic. % | pH | Corr. Rate m.p.y. |
|---|---|---|---|---|---|---|---|---|---|---|---|---|---|
| 1-1 | 846 | 5.06 | 0.359 | 0 | 0 | 0 | 0 | 0 | 0 | 0 | 0 | 3.7 | 90 |
| 1-2 | 859 | 5.06 | 0.353 | 1.06 | 536 | — | 0 | 0 | 515 | 0 | 3.9 | 2.5 | 140 |
| 1-3 | 874 | 5.06 | 0.347 | 1.06 | 536 | 2 | 50 | .80 | 15 | 3.83 | 97.2 | 13.3 | 35 |

TABLE I – Continued

NaOH Injection

| Run No. | Air-flow Lbs/Min | Driver Water Lbs/Sec | Alpha Lbs. H₂O / LB. Air | SO₂ Injected Lb./Min PPM (Vol) | | Chemical Injected Location %Conc. GPM | | | SO₂ Out PPM (Vol) | Equiv. Ratio | Overall Effic. % | pH | Corr. Rate m.p.y. |
|---|---|---|---|---|---|---|---|---|---|---|---|---|---|
| 2–1 | 866 | 5.01 | 0.347 | 1.06 | 537 | — | 0 | 0 | 516 | 0 | 3.9 | | |
| 2–2 | 865 | 4.96 | 0.344 | 1.06 | 531 | 2 | 21 | .74 | 14 | 1.24 | 97.2 | 12.3 | 6.2 |
| 2–3 | 869 | 5.00 | 0.345 | 2.07 | 963 | 2 | 21 | .74 | 36 | 0.68 | 96.3 | 5.5 | 720.0 |
| 2–4 | 869 | 5.00 | 0.345 | 2.07 | 963 | — | 0 | 0 | 926 | 0 | 3.8 | 2.4 | 150 |
| 2–5 | 881 | 4.96 | 0.337 | 2.67 | 1435 | — | 0 | 0 | 1380 | 0 | 3.8 | | |
| 2–6 | 882 | 4.97 | 0.338 | 2.67 | 1435 | 2 | 21 | 1.12 | 56 | 0.68 | 96.1 | 5.7 | 980 |
| 3–1 | 869 | 5.99 | 0.413 | 1.04 | 472 | — | 0 | 0 | 454 | 0 | 3.8 | | |
| 3–2 | 884 | 6.23 | 0.423 | 1.04 | 479 | 2 | 21 | 1.10 | 13 | 2.04 | 97.3 | 13.0 | 16 |
| 4–2 | 843 | 6.28 | 0.447 | 1.05 | 503 | 2 | 5.4 | 1.60 | 21 | 0.66 | 95.8 | | |
| 4–3 | 854 | 6.27 | 0.440 | 1.05 | 503 | 2 | 5.4 | 1.10 | 140 | 0.45 | 72.2 | | |
| 5–1 | 906 | 6.28 | 0.416 | 1.04 | 468 | — | 0 | 0 | 451 | 0 | 3.6 | | |
| 5–2 | 915 | 6.32 | 0.414 | 1.04 | 468 | 1 | 7.1 | 1.16 | 90 | 0.63 | 80.8 | 5.3 | 330 |
| 5–3 | 905 | 6.27 | 0.416 | 1.04 | 468 | 1 | 7.1 | 2.51 | 20 | 1.38 | 95.7 | | |
| 6–1 | 916 | 6.33 | 0.414 | 1.05 | 462 | 3 | 7.1 | 1.27 | 35 | 0.70 | 92.4 | 5.6 | 380 |
| 6–2 | 909 | 6.30 | 0.416 | 1.05 | 468 | 3 | 7.1 | 0.74 | 162 | 0.40 | 65.4 | 2.5 | 290 |
| 7–1 | 902 | 6.26 | 0.416 | 0.90 | 425 | 3 | 1.5 | 4.10 | 89 | 0.47 | 79.1 | 2.5 | 260 |

Table I above sets forth the data for the first group of tests involving the use of sodium hydroxide as the chemical reagent. In Runs 1 through 4, solutions of varying concentration were injected into the nozzle driving water (Location 2), while in Run 5 the solution was injected into the nozzle (Location 1) and in Runs 6 and 7 the solution was added at the nozzle exit (Location 3).

Of particular significance are the data entitled "Equiv. Ratio," "Overall Efficiency;" "pH;" and "Corrosion Rate." The Equivalent Ratio data or "E.R.", is a measure of the efficiency of the use of the chemical reagent in removing $SO_2$. It is determined by the following formula:

Equivalent Ratio =[(Lb./Min. of Chemical)/(Chemical Constant)]/(Lb./Min. of $SO_2$ Injected)

(9)

where the chemical contants are those calculated from equations (1), (3), (5), (7) and (8) and summarized in Table II below:

Table II

| Reagent | Chemical Constant* |
|---|---|
| Sodium Hydroxide (NaOH) | 1.25 |
| Sodium Carbonate (Na₂CO₃) | 1.66 |
| Calcium Hydroxide (Ca(OH)₂) | 1.15 |
| Calcium Carbonate (CaCO₃) | 1.55 |

*Pounds of reagent required to remove one pound of $SO_2$

The chemical constant for the bisulfite reaction is not employed since it is impossible to predict the quantity of bisulfite present. Where, however, the equivalent ratio is less than 1.0 some bisulfite will usually be present.

The "Overall Efficiency" is defined as follows:

Overall Efficiency = [(Inlet $SO_2$ − Outlet $SO_2$)/Inlet $SO_2$] × 100

(10)

The "Overall Efficiency" is thus a measure of the effectiveness of the removal of $SO_2$.

The pH column shows the broad variation in pH that can be observed in the slurry drained from the cyclone separator (or atomizer chamber) while the "Corrosion Rate" column indicates the rate of corrosion in mils per year that would be caused by this slurry.

The data from Table I shows that sodium hydroxide is a powerful $SO_2$ removal agent and that it is more effective when introduced directly into the nozzle driving water (Location 2; Runs 2-3; 2-6; and 4-2) than when introduced within the nozzle (Location 1; Run 5-3) or at the end of the nozzle (Location 3; Run 6-1). The data shows that NaOH can remove over 97% of the $SO_2$ present, whereas in the absence of any chemical reagent only about 4% of the $SO_2$ is removed. However, balancing the effectiveness of the removal of $SO_2$, it is apparent that the use of quantities of NaOH constituting an equivalent ratio less than 1.0 results in a low pH and an extremely high corrosion rate. In Runs 2-3 and 2-6 the corrosion rate was, respectively, 720 and 980 mils per year, whereas the untreated effluent had a corrosion rate between 90 and 150 mils per year. Where, however, excess NaOH was used the corrosion rates dropped drastically while the pH rose to highly basic levels. The use of excess quantities of NaOH may not be a practical answer to the corrosion problem because of the cost of NaOH in comparison to other chemical reagents as shown in Table III below:

Table III

| Reagent | Typical Delivered Cost per Pound |
|---|---|
| Lime (Ca(OH)₂) | $.0103 |
| Caustic (NaOH) | .0423 |
| Limestone (CaCO₃) | .0017* |
| Soda Ash (Na₂CO₃) | .0447 |
| 50% Lime - 50% Caustic | .0263 |

*Excluding crushing and grinding costs

Figure 5:
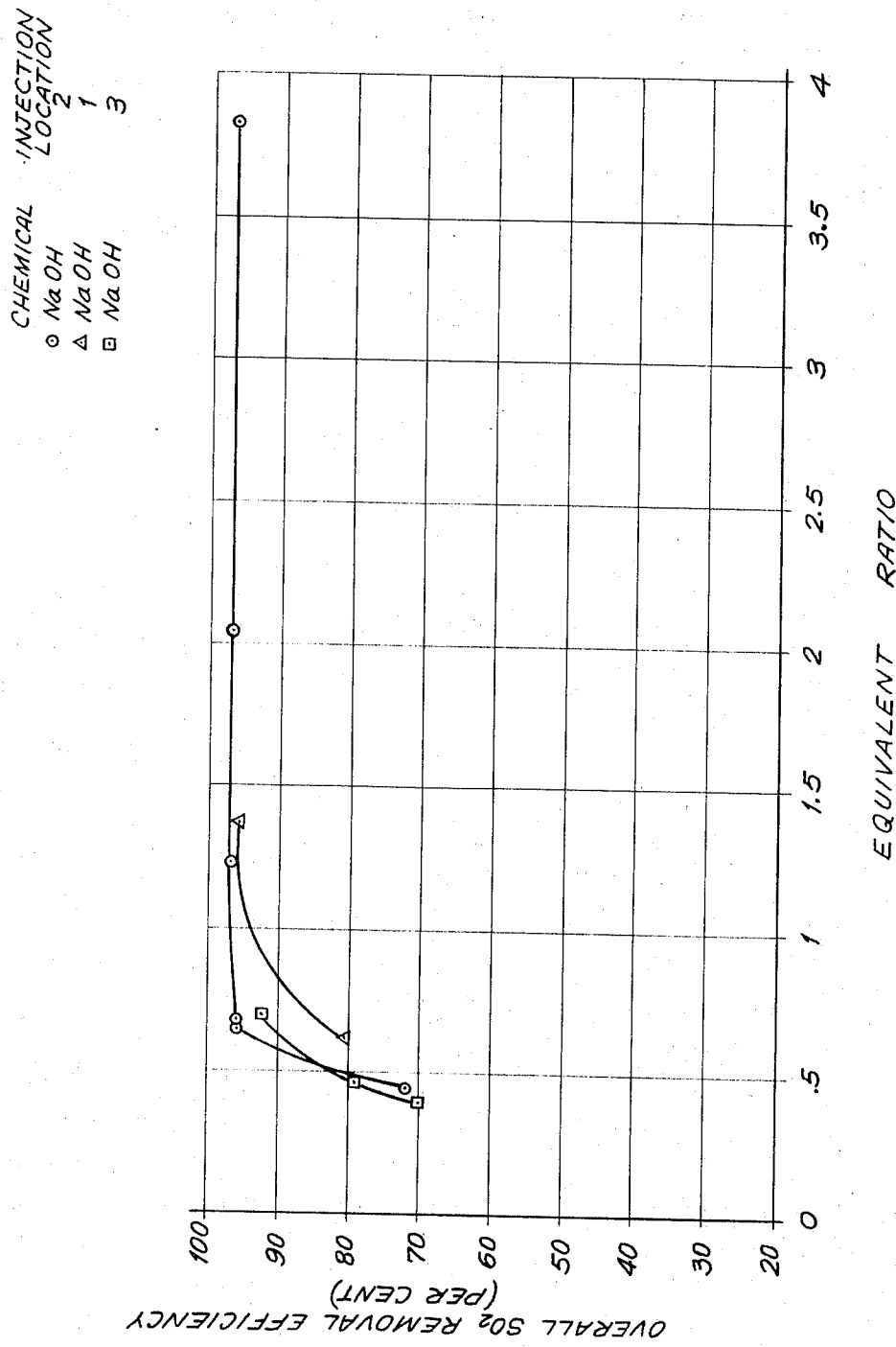
FIG. 5 is a graph showing the relative removal efficiencies obtained when sodium hydroxide was injected at various points in the apparatus.

It is apparent from the data in Table 1 that where the equivalent ratio is less than about 0.66, insufficient reagent was available even to react to form the bisulfite so that less $SO_2$ was removed than the apparatus was otherwise capable of removing. The results of the tests set forth in Table I are shown graphically in FIG. 5.

TABLE IV

$Na_2CO_3$ Injection

| Run No. | Air-flow Lbs/Min | Driver Water Lbs/Sec | Alpha Lbs. $H_2O$/Lb. Air | $SO_2$ Injected Lb./Min | PPM (Vol) | Chemical Injected Location | % Conc. | GPM | $SO_2$ Out PPM (Vol) | Equiv. Ratio | Overall Effic. % | pH | Corr. Rate m.p.y. |
|---|---|---|---|---|---|---|---|---|---|---|---|---|---|
| 8-1 | 880 | 6.30 | 0.426 | 1.06 | 508 | 3 | 5.1 | 3.07 | 45 | 0.83 | 91.1 | 6.7 | 300 |
| 8-2 | 883 | 6.27 | 0.426 | 1.06 | 508 | 3 | 5.1 | 1.69 | 117 | 0.45 | 77.0 | 3.5 | 255 |
| 8-3 | 887 | 6.30 | 0.426 | 1.06 | 508 | 3 | 5.1 | 5.73 | 15 | 1.53 | 97.0 | 9.0 | 20 |
| 9-1 | 898 | 6.36 | 0.424 | 1.06 | 452 | 1 | 5.1 | 1.26 | 195 | 0.37 | 56.9 | 2.8 | 170 |

Figure 6:
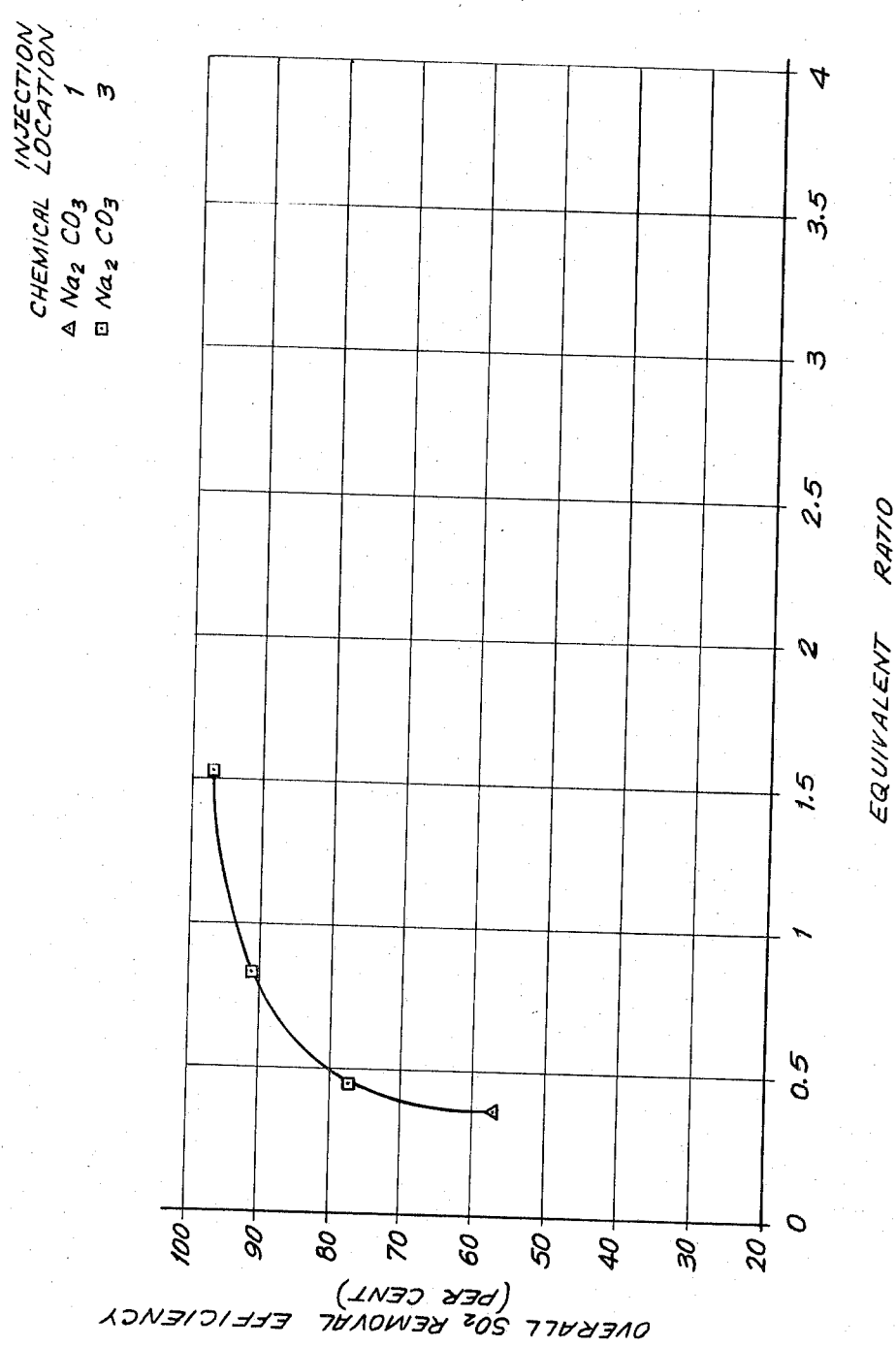
FIG. 6 is a graph showing the relative removal efficiencies obtained when sodium carbonate was injected at various points in the apparatus.

Table IV above sets forth the data for the second group of tests involving the use of sodium carbonate as the chemical reagent. These tests indicate that while sodium carbonate is a powerful $SO_2$ removal agent, it is less powerful than sodium hydroxide and less desirable on an economic basis. It is also apparent that unless excess quantities of the reagent are used (Run 8-3), the presence of the bisulfite will result in an unfavorable corrosion condition (Run 8-1). Although sodium carbonate alone does not appear to be a preferred reagent for the removal of $SO_2$, certain of the disadvantages pointed out above can be overcome, at least in part, by using a mixture of sodium carbonate and lime as the reagent. In the mixture, the sodium carbonate, as the more powerful but more expensive reagent, should be limited in quantity consistent with the requirements for $SO_2$ removal. Where at least 90% of the $SO_2$ must be removed, without pretreatment in the atomizer, at least 20% and preferably 30% of the stoichiometric quantity of the mixture should comprise sodium carbonate with the balance of the mixture consisting essentially of lime. The results of the tests set forth in Table IV are shown graphically in FIG. 6.

lime is a less powerful $SO_2$ removal agent than either of the sodium reagents previously tested, but that good $SO_2$ removal rates can be attained when excess quantities of lime are employed. It may be noted that lime is one of the least expensive of the available reagents and that its use in excess quantities results in low corrosion rate indications (Runs 10-3, 12-1, 16-2, 16-3, 19-2, 19-3, 28-2).

However, the fact that lime is a less powerful $SO_2$ removal agent has enabled applicants to use it as a more precise indicator of the proper point of injection for the chemical reagent and as a means for validating the concept that improved $SO_2$ removal would occur when the reagent is injected into the central portions of the jet emitted from the hot-water ejector nozzle.

As pointed out above, it is not practical to attempt to introduce a lime slurry into high temperature water because of the inevitable scaling problems which result. Thus, no tests were run with injections at Location 2, but tests were run at Locations 1, 3, 4, 5, 6 and 7 identified above.

Considering first Location 7 — the injection into the atomizer spray — it appears from Run 26-1 that with

TABLE V

$Ca(OH)_2$ Injection

| Run No. | Air-flow Lbs/Min | Driver Water Lbs/Sec | Alpha Lbs. $H_2O$/Lb. Air | $SO_2$ Injected Lb./Min | PPM (Vol) | Chemical Injected Location | %Conc. | GPM | $SO_2$ Out PPM (Vol) | Equiv. Ratio | Overall Effic. % | pH | Corr. Rate m.p.y. |
|---|---|---|---|---|---|---|---|---|---|---|---|---|---|
| 10-1 | 872 | 5.06 | 0.348 | 0.96 | 500 | — | 0 | 0 | 480 | 0 | 4.0 | 2.5 | 140 |
| 10-2 | 865 | 5.11 | 0.354 | 0.92 | 485 | 3 | 3 | 4.82 | 113 | 1.22 | 76.7 | 11.9 | 26 |
| 10-3 | 868 | 5.06 | 0.349 | 0.93 | 485 | 3 | 3 | 6.95 | 58 | 1.75 | 88.0 | 12.2 | 9 |
| 11-1 | 858 | 5.06 | 0.354 | 0.92 | 485 | 3 | 5 | 4.93 | 65 | 2.00 | 86.6 | 12.2 | 22 |
| 12-1 | 849 | 5.06 | 0.357 | 0.91 | 485 | 1 | 5 | 4.65 | 33 | 1.91 | 93.2 | 12.2 | 13 |
| 13-1 | 863 | 5.06 | 0.351 | 0.92 | 485 | 1 | 2 | 4.23 | 185 | 0.56 | 61.9 | 3.8 | 100 |
| 13-2 | 870 | 5.06 | 0.348 | 0.84 | 440 | 1 | 2 | 6.97 | 94 | 1.00 | 78.6 | 11.3 | 34 |
| 13-3 | 870 | 5.06 | 0.348 | 0.84 | 440 | 1 | 2 | 8.46 | 80 | 1.22 | 81.8 | | |
| 16-1 | 897 | 5.06 | 0.338 | 0.86 | 435 | — | 0 | 0 | 417 | 0 | 4.1 | | |
| 16-2 | 893 | 5.06 | 0.339 | 0.86 | 435 | 5 | Dry | 4.55 | 15 | 4.60 | 96.6 | 12.2 | 0 |
| 16-3 | 899 | 5.06 | 0.338 | 0.88 | 444 | 5 | Dry | 2.36 | 69 | 2.32 | 84.5 | 12.2 | 10 |
| 19-1 | 874 | 4.49 | 0.308 | 0.90 | 468 | — | 0 | 0 | 450 | 0 | 3.8 | | |
| 19-2 | 853 | 4.49 | 0.316 | 0.88 | 468 | 1 | 3 | 6.35 | 65 | 1.50 | 83.4 | 11.9 | 9 |
| 19-3 | 777 | 4.37 | 0.337 | 0.87 | 510 | 1 | 3 | 6.15 | 75 | 1.46 | 82.5 | 11.9 | 10 |
| 20-1 | 834 | 4.38 | 0.315 | 2.07 | 1123 | — | 0 | 0 | 1079 | 0 | 3.9 | | |
| 20-2 | 837 | 4.38 | 0.314 | 2.07 | 1123 | 1 | 3 | 5.28 | 600 | .55 | 46.6 | 4.3 | 74 |
| 20-3 | 838 | 4.38 | 0.313 | 2.07 | 1123 | 1 | 3 | 5.15 | 618 | .54 | 45.0 | 4.3 | 84 |
| 21-1 | 844 | 4.32 | 0.307 | 4.37 | 2350 | — | 0 | 0 | 2330 | 0 | 0.9 | 2.7 | 130 |
| 21-2 | 776 | 4.32 | 0.338 | 4.02 | 2350 | 1 | 5 | 24.80 | 519 | 2.19 | 77.9 | 12.3 | 40 |
| 26-1 | 991 | 6.59 | 0.399 | 1.63 | 746 | 7 | 2.2 | 13.04 | 302 | 1.25 | 59.5 | 4.5 | 92 |
| 27-1 | 1082 | 6.63 | 0.368 | 2.14 | 898 | — | 0 | 0 | 878 | 0 | 2.2 | | |
| 27-2 | 1089 | 6.61 | 0.364 | 2.15 | 898 | 7 | 1 | 13.11 | 548 | 0.47 | 39.0 | 3.1 | 88 |
| 28-1 | 1097 | 6.65 | 0.363 | 1.87 | 776 | 6 | 0 | 0 | 756 | 0 | 2.6 | | |
| 28-2 | 1071 | 6.50 | 0.364 | 1.83 | 776 | 6 | Dry | 6.33 | 134 | 2.99 | 82.7 | 12.2 | 4 |
| 29-1 | 989 | 6.68 | 0.405 | 1.01 | 462 | — | 0 | 0 | 444 | 0 | 3.9 | | |
| 29-2 | 956 | 6.63 | 0.416 | 0.97 | 462 | 1 | 1 | 12.90 | 99 | 1.03 | 78.6 | 11.2 | 40 |
| 30-1 | 1015 | 6.64 | 0.393 | 1.05 | 468 | — | 0 | 0 | 405 | 0 | 3.8 | | |
| 30-2 | 1037 | 6.61 | 0.382 | 1.07 | 468 | 4 | 1 | 12.90 | 69 | 0.94 | 85.3 | 10.2 | 38 |

Table V above sets forth the data for the third group of tests involving the use of slaked lime ($Ca(OH)_2$) as the chemical reagent. These tests demonstrate that a 25% excess of slaked lime as a lime slurry introduced into the atomizer chamber 18 as a part of the spray water, almost 60% of the $SO_2$ may be removed. This is consistent with applicants' theory that intimate mixing is essential to high $SO_2$ removal efficiency since the atomizer chamber is not a highly efficient mixer. Nevertheless, this test is significant in that it demonstrates that a two-stage removal process can be performed in the existing apparatus using inexpensive lime as the reagent to obtain results comparable to those attained with more powerful, and far more expensive, reagents. Furthermore, the addition of the lime tends to increase the pH and lower the corrosion rate of the slurry leaving the atomizer 18.

Turning next to the injection of dry, powdered lime at Locations 5 and 6 (Runs 16 and 28), difficulties were experienced in attempting to meter precise quantities of the dry, powdered lime into the apparatus. Between two and five times the quantity of lime theoretically required was used. Where the amount of reagent was two to three times the theoretical quantity, $SO_2$ removal did not exceed 85%. The tests thus support the concept that excellent mixing must be present to attain high $SO_2$ removal efficiency since neither of these locations provided for injection of the reagent into the regions where optimum mixing and intimate contact with the reactants is present.

Lime slurries were next injected within the nozzle (Location 1) and at the end of the nozzle (Location 3). Where equivalent ratios in excess of 1.5 were used (over 50% excess lime), the performance at the two locations was indistinguishable as the excess use of lime tended to mask the differences in mixing. However, as the equivalent ratio approached 1.0, improved $SO_2$ removal was achieved where the slurry was injected into the nozzle (Location 1) as compared with surface delivery of the slurry at the end of the nozzle (Location 3).

Applicants then utilized the method of central injection of the lime slurry at Location 4 (Run 30-2) and obtained an $SO_2$ removal efficiency of 85.3% at an equivalent ratio of 0.94. This performance may be compared with an efficiency of 78.6% at an equivalent ratio of 1.03 for injection at Location 1 into the nozzle (Run 29-2) and an efficiency of 76.7% at an equivalent ratio of 1.22 for surface injection at Location 3 (Run 10-2).

In addition to the improved rate of $SO_2$ removal, applicants discovered that injection into the central region of the jet improved the pumping efficiency and decreased the amount of driving water required. Applicants had previously discovered that where substantial quantities of liquid were introduced into the nozzle at Location 1, the pumping efficiency of the ejector was adversely affected (see Table VI below):

On the basis of the data in Tables V and VI, the method of injecting a chemical reagent into the interior of the jet at the nozzle exit not only provides superior mixing to enable more efficient removal of $SO_2$ but also the energy supplied to the jet in this manner permits the quantity of driving water supplied to the nozzle to be reduced. As the nozzle driving water must be carefully treated and raised to a high temperature and pressure, there is considerable economic advantage resulting from any decrease in driving water quantity. This advantage is compounded where, as here, the injection water need not be treated or heated. Additionally, untreated water containing the usual minerals is, as pointed out above, more effective when used as a vehicle for delivering a chemical reagent for $SO_2$ removal.

Figure 7:
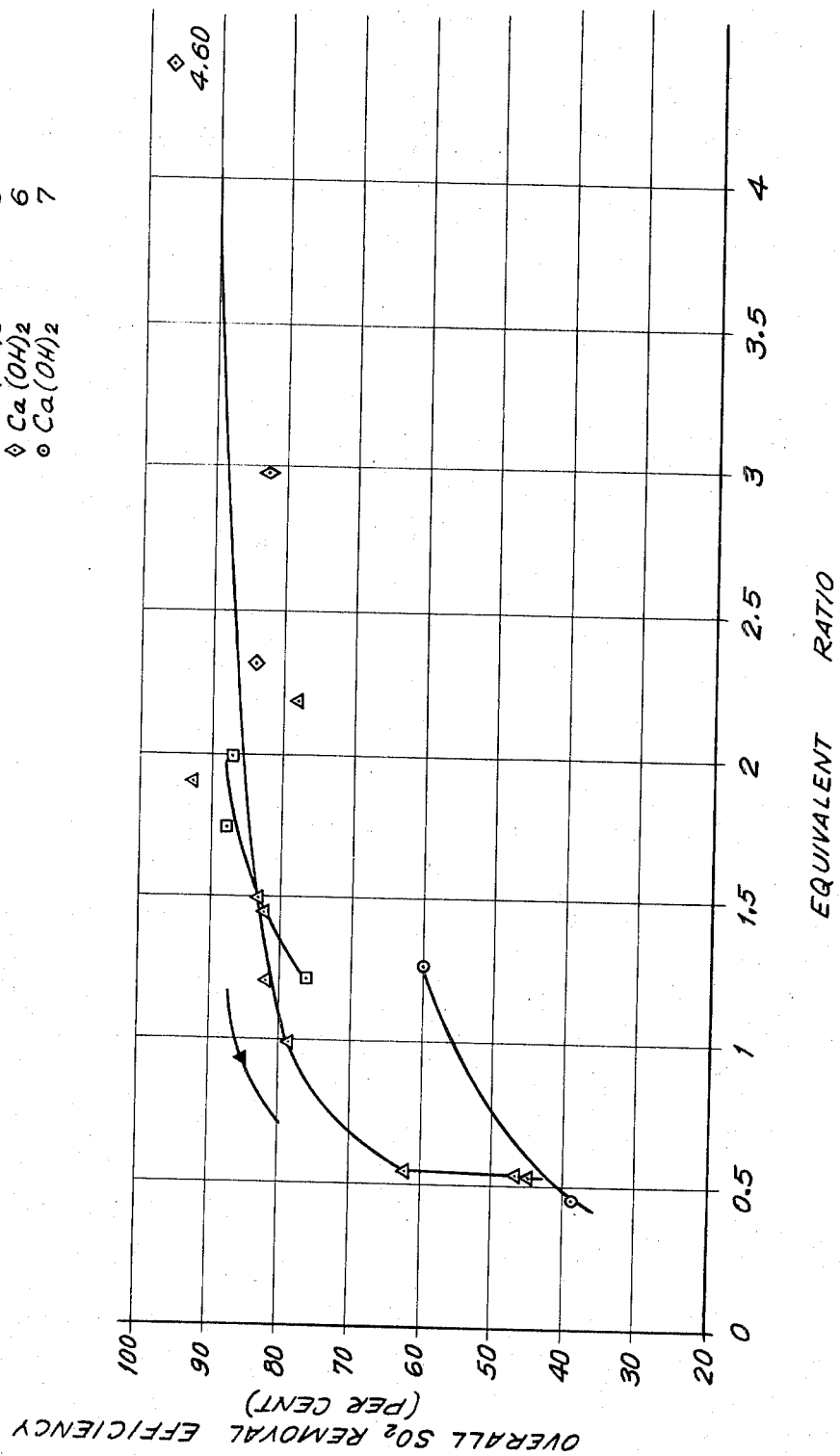
FIG. 7 is a graph showing the relative removal efficiencies obtained when calcium hydroxide was injected at various points in the apparatus.

A still further advantage of the central injection method of introducing the chemical reagent lies in the fact that the injected water and reagent functions as an additional control in the operation of the system. As stated above, it is necessary to hook up the jet in order to begin the pumping action and this can be done either by increasing the nozzle flow or by inserting a resistance in the gas flow circuit. The central injection method provides a third method of hooking up the jet without the use of excess quantities of drive water. Additionally, the injection water may be used as a control means to vary the pumping action of the ejector as required by variations in the gas flow. As variations in the gas flow normally require corresponding variations in the quantity of chemical reagent as well as variations in the energy supplied for pumping, this method of control is both convenient and economically beneficial. The results of the tests set forth in Table V are shown graphically in FIG. 7.

TABLE VI

Water Injection

| Run No. | Airflow Lbs/Min | Driver Water Lbs/Sec | Alpha Lbs.H$_2$O Lb. Air | SO$_2$ Injected Lb./Min PPM (Vol) | | Chemical Injected Location %Conc. GPM | | | SO$_2$ Out PPM (Vol) | Equiv. Ratio | Overall Effic. % | pH | Corr. Rate m.p.y. |
|---|---|---|---|---|---|---|---|---|---|---|---|---|---|
| 18-1 | 841 | 4.81 | 0.343 | 0 | 0 | 1 | — | 11.00 | 0 | 0 | 0 | — | — |
| 18-2 | 556 | 2.97 | 0.321 | 0 | 0 | 1 | — | 11.60 | 0 | 0 | 0 | — | — |
| 18-3 | 763 | 4.32 | 0.339 | 0 | 0 | 1 | — | 11.20 | 0 | 0 | 0 | — | — |
| 18-4 | 927 | 5.43 | 0.351 | 0 | 0 | 1 | — | 10.15 | 0 | 0 | 0 | — | — |
| 18-5 | 730 | 4.26 | 0.350 | 0 | 0 | 1 | — | 26.44 | 0 | 0 | 0 | — | — |

TABLE VII

Limestone, Oyster Shell Injection

| Run No. | Airflow Lbs/Min | Driver Water Lbs/Sec | Alpha Lbs. H$_2$O Lb. Air | SO$_2$Injected Lb./Min PPM (Vol) | | Chemical Injected Location %Conc. GPM | | | SO$_2$Out PPM (Vol) | Equiv. Ratio | Overall Effic. % | pH | Corr. Rate m.p.y. |
|---|---|---|---|---|---|---|---|---|---|---|---|---|---|
| 14-2 | 866 | 5.01 | 0.346 | 0.85 | 446 | 1*(1) | — | 9.51 | 327 | 3.51 | 26.7 | 5.7 | 100 |
| 14-3 | 884 | 5.01 | 0.340 | 0.87 | 446 | 3*(1) | — | 9.51 | 339 | 3.44 | 24.0 | 5.5 | 95 |
| 15-1 | 885 | 5.01 | 0.339 | 0.96 | 436 | 3*(2) | — | 6.26 | 389 | 1.98 | 33.7 | 6.4 | 130 |
| 17-1 | 897 | 5.06 | 0.338 | 0.86 | 435 | 5*(3) | Dry | 0.91 | 285 | 0.68 | 34.5 | 6.7 | 80 |

*Notes:
(1) - Limestone Slurry
(2) - Oyster Shell Slurry
(3) - Dry Limestone

Table VII sets forth the results of tests run in which calcium carbonate as a slurry of limestone or ground oyster shells or as dry powder was injected into the system at Locations 1, 3 and 5. As anticipated, limestone is a relatively poor $SO_2$ removal agent. The poor performance of limestone appears to be related to its particle size and the corresponding slow reaction rates.

of 1.0 as ratios over about 1.5 to 2.0 are substantially in excess of the stoichiometric requirements. With respect to the mixture of chemicals employed, sodium hydroxide is a more powerful but far more expensive reagent than lime. Sodium hydroxide should therefore be used in the minimum quantity consistent with the removal requirements and the balance of the mixture

TABLE VIII

NaOH-Ca(OH)₂ Mixture Injection

| Run No. | Airflow Lbs/Min | Driver Water Lbs/Sec | Alpha Lbs. H₂O Lb. Air | SO₂ Injected Lb./Min | SO₂ Injected PPM (Vol) | Chemical Injected Location | Chemical Injected %Conc. | Chemical Injected GPM | SO₂ Out PPM (Vol) | Equiv. Ratio | Overall Effic. % | pH | Corr. Rate m.p.y. |
|---|---|---|---|---|---|---|---|---|---|---|---|---|---|
| 22-1 | 1007 | 5.74 | 0.342 | 0 | 0 | — | 0 | 0 | 0 | 0 | 0 | — | — |
| 22-2 | 949 | 5.74 | 0.363 | 3.98 | 1906 | 1 | *(1) | 18.82 | 90 | 2.05 | 95.3 | 12.7 | 11 |
| 12-1 | 988 | 5.72 | 0.348 | 0 | 0 | — | 0 | 0 | 0 | 0 | 0 | — | — |
| 23-2 | 953 | 5.75 | 0.362 | 4.00 | 1906 | 3 | *(2) | 18.33 | 121 | 2.06 | 93.7 | 12.7 | 10 |
| 24-1 | 1011 | 6076 6.35 | 0.377 | 0 | 0 | — | 0 | 0 | 0 | 0 | 0 | — | — |
| 24-2 | 974 | 6.35 | 0.391 | 4.07 | 1898 | 1 | *(3) | 19.81 | 49 | 2.06 | 97.4 | 12.8 | 10 |
| 25-1 | 1025 | 6.52 | 0.382 | 0 | 0 | — | 0 | 0 | 0 | 0 | 0 | — | — |
| 25-2 | 988 | 6.60 | 0.400 | 1.69 | 775 | 1 | *(4) | 7.16 | 20 | 1.10 | 97.4 | 6.7 | 38 |
| 31-1 | 1035 | 6.47 | 0.375 | 3.14 | 1378 | 4 | *(4) | 13.16 | 47.0 | 1.09 | 96.6 | 8.0 | 85 |

Notes
(1) .104 Lb./Gal NaOH; .416 Lb./Gal Ca(OH)₂
(2) .0692 Lb./Gal NaOH; .416 Lb./Gal Ca(OH)₂
(3) .155 Lb./Gal NaOH; .300 Lb./Gal Ca(OH)₂ NaOH;
(4) .155 Lb./Gal NaOH; .146 Lb./Gal Ca(OH)₂

Table VIII sets forth data relating to a series of tests in which the chemical reagent was a mixture of sodium hydroxide and calcium hydroxide injected at Locations 1, 3 and 4. In each of these tests, $SO_2$ removal efficiencies in excess of 93% were attained. In Runs 25-2 and 31-2 an equivalent ratio approaching 1.0 was employed and with an $SO_2$ removal efficiency of about 97%. At the same time, pH values in the neutral range and relatively low corrosion index figures were obtained. These tests thus demonstrated an efficient use of the chemical reagents with a good control of pH and the consequent corrosion rates. In Runs 22-2, 23-2 and 24-2 an amount of chemical reagent was used which was substantially in excess of the stoichiometric quantity required for reaction with the sulfur dioxide present in the carrier gas as shown by the equivalent ratios of about 2.0 recorded for these tests. The excess chemical reagent caused the pH of the slurry to be extremely high and the corrosion rate to be very low, but these favorable properites were attained at a high chemical reagent cost. In general it is desirable to employ equivalent ratios in the vicinity should be lime. Where at least 90% of the $SO_2$ must be removed, without pretreatment in the atomizer, at least 10%, and preferably 20%, of the stoichiometric quantity of the mixture should comprise sodium hydroxide with the balance of the mixture consisting essentially of lime. Where higher $SO_2$ removal efficiencies are required, the sodium hydroxide content of the mixture may be increased or the carrier gases may be pretreated in the atomizer to provide a two-stage $SO_2$ removal process. Of course, both alternatives may be employed simultaneously with still further improvement in the $SO_2$ removal efficiency. These tests also demonstrated that injecting the chemical reagent into the central portions of the jet contributed to the pumping efficiency.

The advantage of the combination of reagents is further demonstrated by a comparison of Run 31-1 (Table VIII) and Run 30-2 (Table V) wherein the use of a mixture of lime and caustic in place of lime alone increased the removal efficiency by 10%.

TABLE IX

Effect of CO₂ with Various Chemicals Injected

| Run No. | Airflow Lbs/Min | Driver Water Lbs/Sec | Alpha Lbs. H₂O Lb. Air | SO₂ Injected Lb./Min | SO₂ Injected PPM (Vol) | Chemical Injected Location | Chemical Injected %Conc. | Chemical Injected GPM | SO₂ Out PPM (Vol) | Euiv. Ratio | Overall Effic. % | pH | Corr. Rate m.p.y. |
|---|---|---|---|---|---|---|---|---|---|---|---|---|---|
| 101-1 | 1071*(4) | 6.05 | 0.339 | 1.86 | 787.5 | 4 | 2.35*(6) | 12.95 | 120.6 | 1.21 | 84.7 | 12.2 | 20 |
| 101-2 | 1071*(5) | 6.05 | 0.339 | 1.76 | 747.3 | 4 | 2.35*(6) | 12.95 | 130.6 | 1.27 | 82.5 | 11.2 | 30 |
| 101-3 | 1086*(4) | 6.06 | 0.335 | 1.88 | 787.5 | — | — | — | 767.5 | — | 2.5 | 3.2 | 150 |
| 102-1 | 1045*(4) | 5.86 | 0.337 | 2.29 | 993.7 | — | — | — | 973.7 | — | 2.0 | 2.8 | — |
| 102-2 | 1016*(4) | 5.86 | 0.346 | 2.22 | 993.7 | 4 | 2.35*(6) | 13.00 | 230.0 | 1.01 | 76.9 | 11.7 | 78 |
| 102-3 | 1029*(5) | 5.77 | 0.337 | 2.25 | 993.7 | 4 | 2.35*(6) | 13.00 | 245.0 | 1.00 | 75.3 | 11.5 | 72 |
| 104-1 | 1001*(5) | 5.95 | 0.357 | 2.43 | 1104.5 | 4 | 2.12*(6) | 13.00 | 398.0 | 0.83 | 64.0 | 10.4 | — |
| 104-2 | 977*(4) | 6.05 | 0.372 | 2.37 | 1104.5 | 4 | 2.12*(6) | 13.00 | 331.5 | 0.85 | 70.0 | 11.4 | — |
| 104-3 | 987*(4) | 5.95 | 0.362 | 2.40 | 1104.5 | — | — | — | 1084.5 | — | 1.8 | — | — |
| 105-1 | 978*(5) | 5.95 | 0.365 | 4.86 | 2255.0 | 4 | 3.30*(6) | 22.3 | 479.5 | 1.10 | 78.7 | 11.8 | — |
| 105-2 | 996*(4) |  | 0.356 | 4.94 | 2255.0 | — | — | — | 2235.0 | — | 0.9 | — | — |
| 106-1 | 1006*(5) | 5.86 | 0.351 | 2.38 | 1074.5 | 4 | 2.12*(1) | 13.3 | 101.5 | 0.87 | 90.6 | 6.4 | — |
| 106-2 | 993*(4) | 5.86 | 0.354 | 2.35 | 1074.5 | 4 | 2.12*(1) | 13.3 | 77.5 | 0.88 | 92.8 | 6.4 | — |
| 106-3 | 1004*(4) | 5.84 | 0.349 | 2.37 | 1074.5 | — | — | — | 1054.5 | — | 1.9 | — | — |
| 107-1 | 1002*(5) | 5.80 | 0.347 | 2.30 | 1044.0 | 4 | 2.12*(2) | 13.0 | 152.5 | 0.88 | 85.4 | 6.9 | — |
| 107-2 | 1000*(4) | 5.81 | 0.349 | 2.30 | 1044.0 | 4 | 2.12*(2) | 13.0 | 110.0 | 0.88 | 89.5 | — | — |

TABLE IX — Continued

Effect of $CO_2$ with Various Chemicals Injected

| Run No. | Airflow Lbs/Min | Driver Water Lbs/Sec | Alpha Lbs. $H_2O$ / Lb. Air | $SO_2$ Injected Lb./Min. | $SO_2$ Injected PPM (Vol) | Chemical Injected Location | Chemical Injected %Conc. | Chemical Injected GPM | $SO_2$ Out PPM (Vol) | Euiv. Ratio | Overall Effic. % | pH | Corr. Rate m.p.y. |
|---|---|---|---|---|---|---|---|---|---|---|---|---|---|
| 107-3 | 1007*(4) | 5.84 | 0.348 | 2.31 | 1044.0 | — | — | — | 1024.0 | — | 1.9 | — | — |
| 108-1 | 1021*(5) | 5.89 | 0.346 | 2.28 | 1013.5 | 4 | 1.70*(3) | 13.2 | 230.0 | 0.72 | 77.3 | — | — |
| 108-2 | 1012*(4) | 5.80 | 0.344 | 2.26 | 1013.5 | 4 | 1.70*(3) | 13.2 | 199.6 | 0.73 | 80.3 | — | — |
| 108-3 | 1026*(4) | 5.74 | 0.336 | 2.29 | 1013.5 | — | — | — | 993.5 | — | 2.0 | — | — |
| 109-1 | 1037*(5) | 5.75 | 0.333 | 1.23 | 540.0 | 4 | 4.3*(7) | 13.6 | 429.0 | 2.54 | 20.6 | — | — |
| 109-2 | 1029*(4) | 5.86 | 0.341 | 1.22 | 540.0 | 4 | 4.3*(7) | 13.6 | 429.0 | 2.54 | 20.6 | — | — |
| 109-3 | 1038*(4) | 5.81 | 0.336 | 1.23 | 540.0 | — | — | — | 525.0 | — | 2.8 | — | — |

Figure 10:
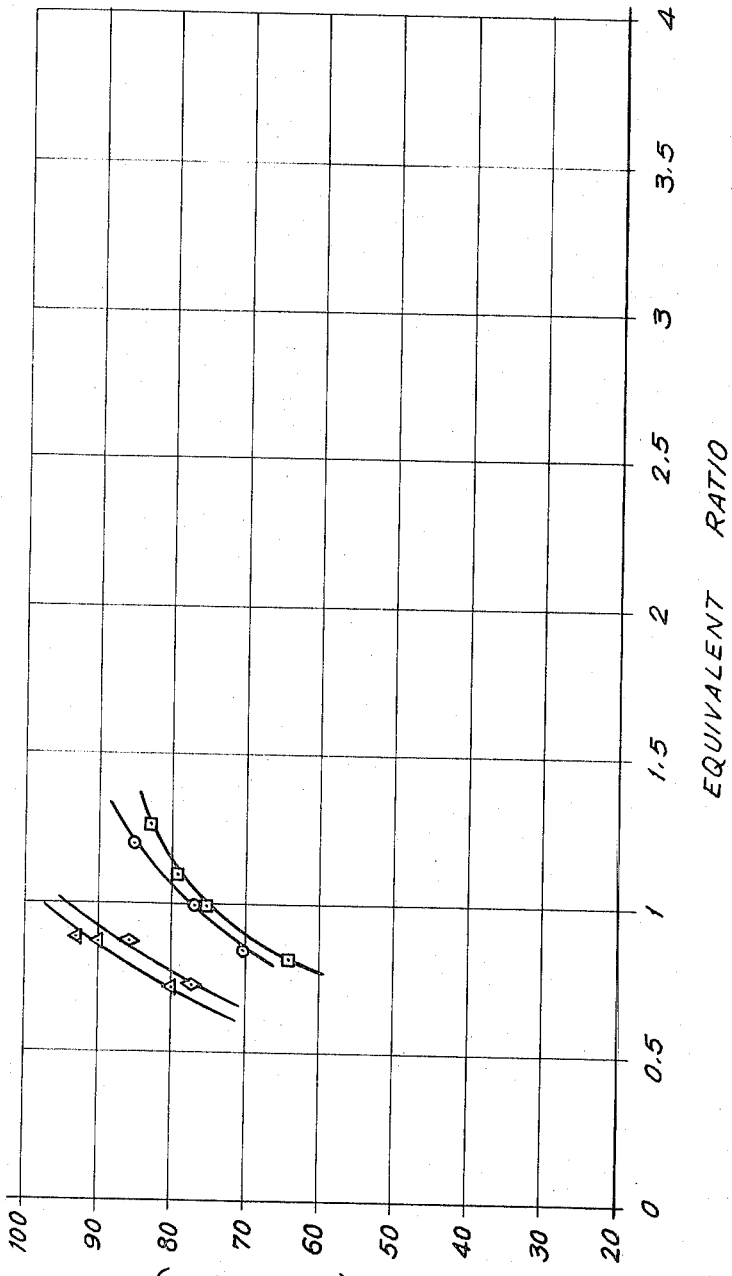
FIG. 10 is a graph showing the relative removal efficiencies of various chemical reagents injected into the interior of the jet spray at the end of the nozzle in the presence of carbon dioxide.

Notes
(1) 0.106 Lb./Gal $Ca(OH)_2$, 0.077 Lb./Gal NaOH
(2) 0.14 Lb./Gal $Ca(OH)_2$, 0.04 Lb./Gal NaOH
(3) 0.112 Lb./Gal $Ca(OH)_2$, 0.032 Lb./Gal NaOH
(4) No $CO_2$ Added
(5) 6.5% $CO_2$ Added
(6) Lime as $Ca(OH)_2$ injected
(7) Limestone as $CaCO_3$ injected Table IX sets forth data relating to a series of tests established to determine the effect of the presence of about 6.5% $CO_2$ in the carrier gas on the efficiency of $SO_2$ removal when using, as chemical reagents, lime or various mixtures of lime and caustic soda. These tests were performed because $CO_2$ is usually found in the off-gases from refining or smelting operations and in the off-gases from combustion processes. These tests demonstrate that the $SO_2$ removal efficiencies are decreased when $CO_2$ is present within a range of 2–6%, depending upon the proportion of lime used in the chemical reagent; the decrease being on the order of 6% where lime only is used. The results of these tests are shown graphically in FIG. 10 and demonstrate that, even in the presence of $CO_2$, removal efficiencies for $SO_2$ in excess of 90% can be attained when mixtures of lime and caustic soda at an equivalent ratio of about 1.0 are injected into the central regions of the jet emitted by the Frenzl hot-water ejector. As noted above, even higher removal efficiencies may be attained by combining the process involving injection of reagents into the jet stream with pretreatment in the atomizer chamber.

Figure 9:
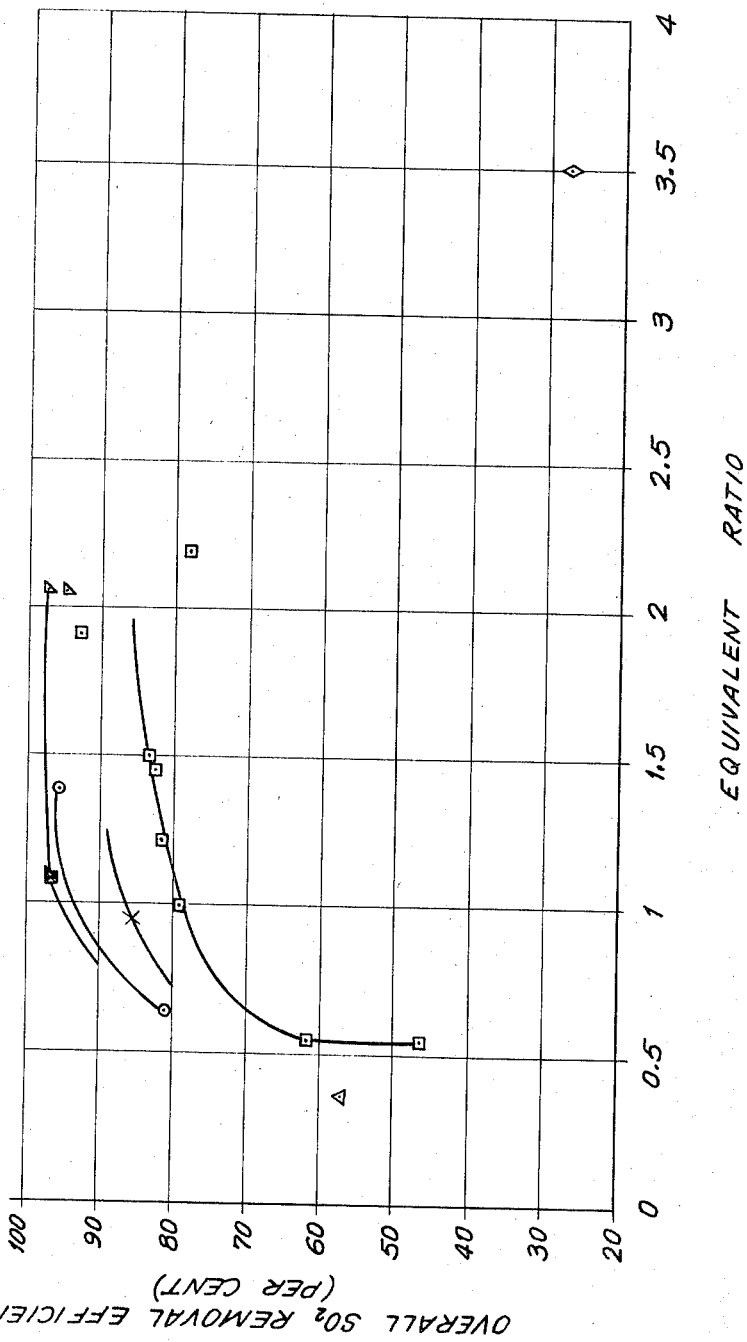
FIG. 9 is a graph showing a comparison of the relative removal efficiencies of the various chemical reagents injected directly into the nozzle driving water and into the interior of the jet spray at the end of the nozzle.

FIG. 9 is a graphical summary of the data for each of the chemical reagents tested when injected within the nozzle (Location 1) or when injected into the central portion of the emerging jet (Location 4) and shows the improvement in $SO_2$ removal efficiency which results from the injection at Location 4.

In the tests set forth in Tables V and IX involving the injection of lime slurries at various locations within the apparatus, the level of $SO_2$ injected was varied from about 450 parts per million to as much as 2350 parts per million. Where relatively large amounts of $SO_2$ were injected, it was noted that the removal efficiency was somewhat lower but not necessarily in proportion to the quantity of $SO_2$ injected. Applicants knew that the reactivity of lime with $SO_2$ was related to its solubility and believed that the variations in the removal efficiency might indicate that greater effective solubility of lime was attained when the lime was injected in certain locations than in others.

The solubility of lime in the ambient temperature lime slurry injected at Locations 1 and 4 and delivered at Location 3 is about 1850 parts per million. The clean hot drive water used in the nozzle, of course, contained no lime. However, when the drive water expands through the nozzle it will be cooled to about 170°F. and is capable of dissolving about 1020 parts per million of lime. As about 35 gallons per minute of drive water was used during the tests, it is apparent that, if highly efficient mixing were available, additional quantities of lime could be placed in a condition to react with any sulfur dioxide present.

Figure 8:
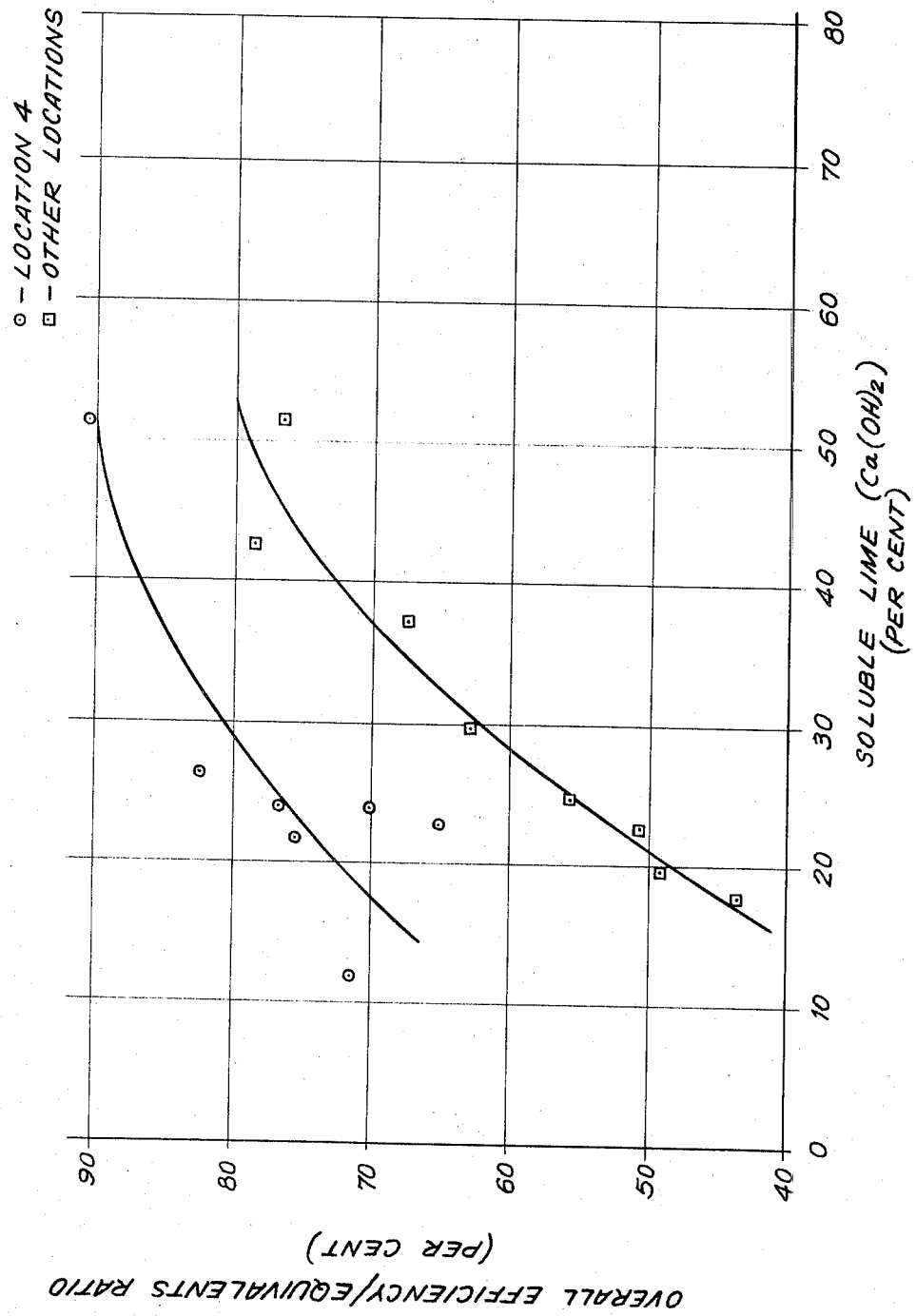
FIG. 8 is a graph showing the improvement in the removal of sulfur dioxide according to the process of the present invention as a function of the effective increase in lime solubility.

The data was then reanalyzed on the basis that the dissolved lime was equal to the lime dissolved in the injection water plus the lime dissolved in the drive water. Thus, the "soluble" lime, expressed as a percent was equal to the lime dissolved in the injection water plus the lime dissolved in the drive water divided by the total lime added. The soluble lime data was then plotted in FIG. 8 as the abscissa against the ratio of the overall efficiency divided by the equivalent ratio as the ordinate. FIG. 8 shows two distinct families of data which are a function of the location at which the lime is injected in the system. From these data it is apparent that a substantial improvement in $SO_2$ removal efficiency can be attained by introducing the chemical reagent used to react with the $SO_2$ at a location where violently turbulent mixing conditions are present (Location 4) as compared with other locations where less effective mixing conditions exist (Locations 1 and 3).

From the data set forth in Tables I, IV, V, VII, VIII and IX, it will be noted that relatively small quantities of water are required to provide the driving power for the system and to serve as a vehicle for the introduction of the chemical reagent as compared to conventional wet scrubbing systems. This is due to the high efficiency of the mixing processes involved in the present invention. Furthermore, only a small amount of equipment is required in addition to the particulate removal equipment in order to provide for the removal of $SO_2$. As a result of these factors, the capital cost of equipment required to perform the present process will be relatively low and the operating and maintenance cost will be correspondingly low. On the basis of the tests set forth above, and the cost data from Table III the injected cost of chemical per pound of $SO_2$ removed, is shown in Table X below.

Table X

| Chemical Reagent | Cost/Lb.$SO_2$ Removed |
|---|---|
| Caustic (NaOH) | $.0397 |
| Soda Ash ($Na_2CO_3$) | .0662 |
| Lime ($Ca(OH)_2$) | .0235 |
| Limestone ($CaCO_3$) | .0269 |
| 50% Lime - 50% Caustic | .0304 |

Figure 2:
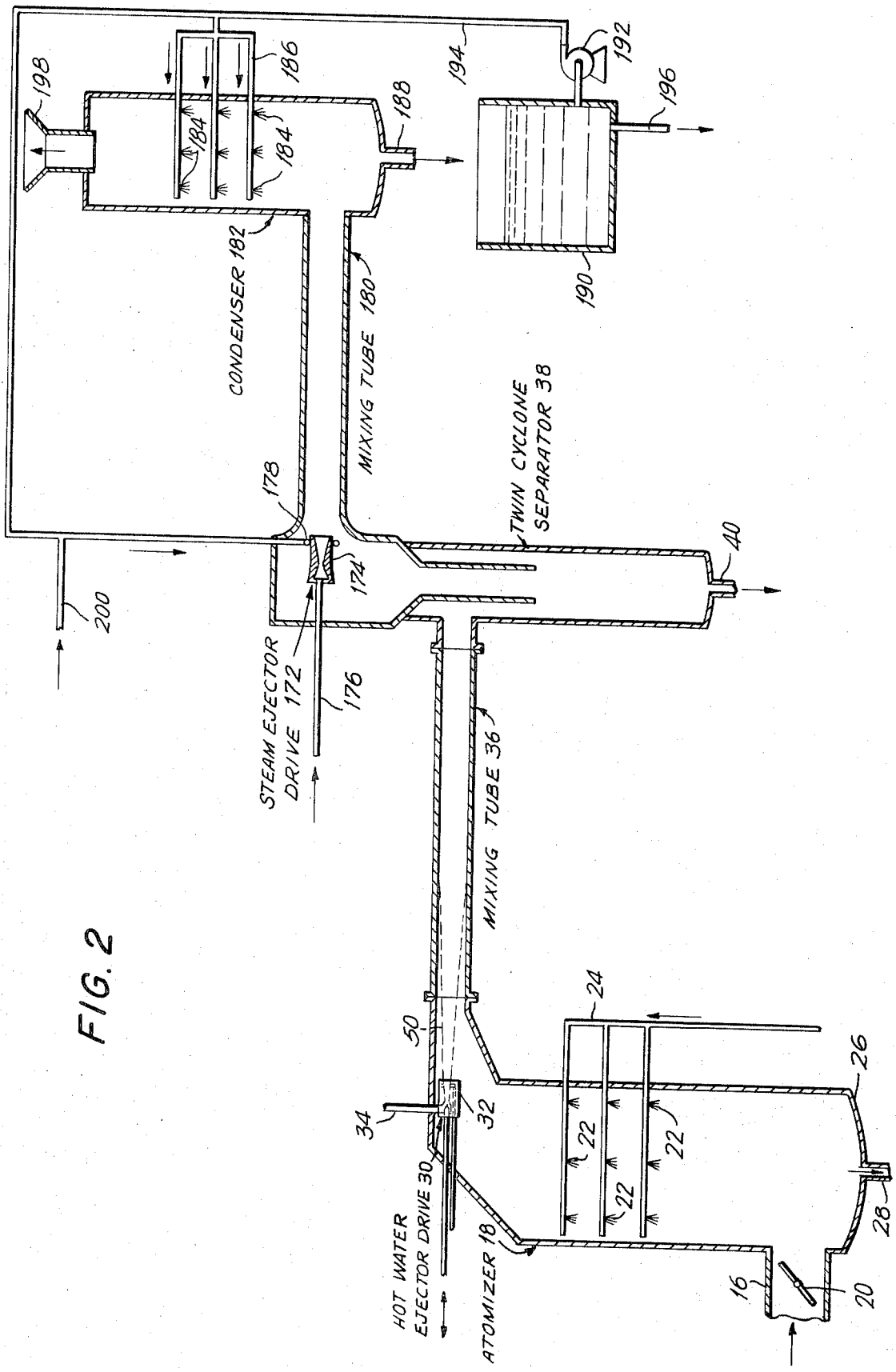
FIG. 2 is a schematic arrangement of the atomizer and chemical injector, hot-water drive and chemical injector, mixing tube, twin cyclone separator, steam ejector with a chemical supply and condenser employed to perform alternative forms of the process of the present invention.

A further modification of the process of the present invention is shown in FIG. 2. In this adaptation a steam or water ejector, secondary mixing tube and steam condenser is provided in addition to the basic atomizer, Frenzl drive, mixing tube and twin cyclone separator shown in FIG. 1.

As shown in FIG. 2, a steam ejector drive 172 communicates with the stacks of the twin cyclone separator 38. The steam ejector drive includes an adjustable nozzle 174 driven by high pressure steam delivered through steam supply line 176. A series of secondary injectors 178 is formed adjacent to the end of the nozzle 174 through which fluids, chemical reagents, or mixtures or solutions of fluids and chemical reagents can be injected into the central region of the conical jet spray emitted by the nozzle 174. The steam, the effluent from the separators 38 and the fluids, if any, injected through the secondary injectors 178 are mixed in the mixing tube 180 which communicates with a steam condenser 182. Spray nozzles 184 connected to a water supply manifold 186 are positioned within the steam condenser 182. Condensate is withdrawn from the steam condenser 182 at drain 188 and collected in the condensate tank 190. A portion of the condensate may be pumped from the condensate tank 190 by pump 192 through supply line 194 to the supply manifold 186 and the secondary injectors 178 while the excess condensate may be withdrawn at drain 196. Clean gas leaves the steam condenser 182 through the stack 198. A chemical supply line 200 communicates with the water supply line 194 to permit the introduction of chemical reagents into the secondary injectors 178.

While the gas emerging from the twin cyclone separators 38 will be substantially free from particulates and, to the extent of solubility, any soluble gases contained in the carrier gas, the emerging gas will have substantial amounts of steam and may also contain vapors, odors, and small amounts of sulfur dioxide.

The steam condenser 182, however, is operated under conditions which will result in the condensation of steam and vapors having a dew point higher than steam, and will thus separate from the gas all such steam and vapors. It has been found that potassium permanganate is effective to react with and remove most organic compounds which cause odors when vigorous reaction conditions are available. Potassium permanganate will also react with the acidic gases such as hydrogen sulfide and sulfur dioxide if these are present. Thus, by injecting a solution of potassium permanganate through the secondary injectors 178 it is possible to remove any vestiges of sulfur dioxide which may retain in the gas exiting from the twin cyclone separators 38 as well as the odors which may be contained therein.

It will be appreciated, therefore, that the apparatus shown in FIG. 2 makes possible a three-stage process for the removal of sulfur dioxide together with the removal of odors and the condensation of steam and condensible vapors.

As the steam ejector drive 172 lowers the pressure at the exhaust of the cyclone separators 38, it will be appreciated that the driving conditions for the hot-water drive 30 will be ameliorated so as to permit the use of less water, i.e., a lower alpha ratio, in the hot-water drive. Under certain conditions of operation this may result in substantial economies, especially where steam for the steam ejector drive is already available and untreated condensate may be used to supplement the energy of the steam.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A process for the removal of gaseous sulfur dioxide from a carrier gas comprising driving the carrier gas through an elongate mixing tube and forming a turbulent mixture of steam, atomized water and sulfur dioxide-containing carrier gas by directing water, heated to a temperature above its boiling point at atmospheric pressure and maintained under pressure sufficient to prevent boiling at that temperature, through a converging-diverging nozzle to form a jet of atomized water and steam directed into the mixing tube, introducing a fluid-contained alkaline reagent into the central portion of said turbulent mixture in said mixing tube by forming a series of intense jets of said fluid-contained alkaline reagent disposed circumferentially about the jet of atomized water and steam emerging from said nozzle and injecting said intense jets generally in the direction of movement of and into the jet of atomized water and steam emerging from said nozzle, further mixing the alkaline reagent and the sulfur dioxide-containing carrier gas by the continued expansion of the utilized water within the mixing tube, and so regulating the flow of said turbulent mixture through said mixing tube as to provide retention time of said turbulent mixture in said mixing tube sufficient for reaction of sulfur dioxide in said carrier gas with the alkaline reagent to form aqueous droplets of sulfur-containing reaction products and for growth in size of said aqueous droplets, and thereafter separating said aqueous droplets thus grown in size from the remainder of said carrier gas.

2. The process described in claim 1 in which the alkaline reagent consists essentially of at least one of the reagents selected from the group consisting of calcium oxide, calcium hydroxide, sodium hydroxide, sodium carbonate, magnesium oxide, ammonium hydroxide and potassium permanganate.

3. The process described in claim 1 in which the alkaline reagent comprises a mixture of calcium hydroxide and sodium carbonate.

4. The process described in claim 1 in which the alkaline reagent comprises a mixture of calcium hydroxide and sodium hydroxide.

5. The process described in claim 4 in which the alkaline reagent comprises a mixture of calcium hydroxide and sodium hydroxide wherein the sodium hydroxide comprises at least 10% of the stoichiometric equivalent of the mixture required to react with the sulfur dioxide present in the carrier gas and the quantity of the mixture of calcium hydroxide and sodium hydroxide does not exceed the stoichiometric quantity required for reaction by a substantial amount.

6. The process described in claim 1 where the carrier gas from which the sulfur dioxide has been removed is further treated to remove steam and other condensible vapors contained therein comprising the additional steps of driving the carrier gas with a steam jet ejector and condensing the steam and other condensible vapors contained in the carrier gas in a steam condenser.

7. The process described in claim 6 in which the alkaline reagent consists essentially of at least one of the reagents selected from the group consisting of calcium oxide, calcium hydroxide, sodium hydroxide, sodium carbonate, magnesium oxide, ammonium hydroxide and potassium permanganate.

8. The process described in claim 6 in which the alkaline reagent comprises a mixture of calcium hydroxide and sodium carbonate.

9. The process described in claim 6 wherein the alkaline reagent comprises a mixture of calcium hydroxide and sodium hydroxide.

10. The process described in claim 9 in which the alkaline reagent comprises a mixture of calcium hydroxide and sodium hydroxide wherein the sodium hydroxide comprises at least 10% of the stoichiometric equivalent of the mixture required to react with the sulfur dioxide present in the carrier gas and the quantity of the mixture of calcium hydroxide and sodium hydroxide does not exceed the stoichiometric quantity required for reaction by a substantial amount.

11. The process described in claim 1 which includes conditioning of the carrier gas in a chamber by spraying the gas in said chamber with an alkaline reagent in an aqueous carrier prior to said driving of the carrier gas through said mixing tube.

12. The process described in claim 11 in which the alkaline reagent consists essentially of at least one of the reagents selected from the group consisting of calcium oxide, calcium hydroxide, sodium hydroxide, sodium carbonate, magnesium oxide, ammonium hydroxide and potassium permanganate.

13. The process described in claim 12 in which the alkaline reagent comprises a mixture of calcium hydroxide and sodium carbonate.

14. The process described in claim 11 in which the alkaline reagent utilized to condition the carrier gases is calcium hydroxide and the alkaline reagent injected into the central portion of the turbulent mixture in said mixing tube comprises a mixture of calcium hydroxide and sodium hydroxide.

15. The process described in claim 14 in which the alkaline reagent comprises a mixture of calcium hydroxide and sodium hydroxide wherein the sodium hydroxide comprises at least 10% of the stoichiometric equivalent of the mixture required to react with the sulfur dioxide present in the carrier gas and the quantity of the mixture of calcium hydroxide and sodium hydroxide does not exceed the stoichiometric quantity required for reaction by a substantial amount.

16. The process described in claim 11 wherein the carrier gas from which the sulfur dioxide has been removed is further treated to remove steam and other condensible vapors contained therein comprising the additional steps of driving the carrier gases with a steam jet ejector and condensing the steam and other condensible vapors contained therein in a steam condenser.

17. The process described in claim 12 wherein the carrier gas from which the sulfur dioxide has been removed is further treated to remove steam and other condensible vapors contained therein comprising the additional steps of driving the carrier gases with a steam jet ejector and condensing the steam and other condensible vapors contained therein in a steam condenser.

18. The process described in claim 13 wherein the carrier gas from which the sulfur dioxide has been removed is further treated to remove steam and other condensible vapors contained therein comprising the additional steps of driving the carrier gases with a steam jet ejector and condensing the steam and other condensible vapors contained therein in a steam condenser.

19. The process described in claim 14 wherein the carrier gas from which the sulfur dioxide has been removed is further treated to remove steam and other condensible vapors contained therein comprising the additional steps of driving the carrier gases with a steam jet ejector and condensing the steam and other condensible vapors contained therein in a steam condenser.

20. The process described in claim 15 wherein the carrier gas from which the sulfur dioxide has been removed is further treated to remove steam and other condensible vapors contained therein comprising the additional steps of driving the carrier gases with a steam jet ejector and condensing the steam and other condensible vapors contained therein in a steam condenser.

21. The process described in claim 1 which includes further treating said remainder of said carrier gas to remove additional sulfur dioxide by driving said remainder of said carrier gas with a steam jet ejector utilizing saturated steam as the driving fluid, forming a turbulent mixture of steam and said remainder of said carrier gas by expanding the saturated steam through the nozzle of the steam ejector, injecting a second alkaline reagent into the central portion of the turbulent mixture of steam and gas, further mixing said second alkaline reagent and the sulfur dioxide-containing gas by the continued expansion of the steam driving fluid to cause reaction of the remaining gaseous sulfur dioxide with said second alkaline reagent to form and to promote the growth in size of a second group of aqueous droplets of sulfur-containing reaction products, separating said second group of droplets from the now-remaining carrier gas, and condensing the remaining condensible vapors in a steam condenser.

22. The process described in claim 21 in which the alkaline reagents injected into the central portion of the turbulent mixture in said mixing tube and into the central portion of said turbulent mixture of steam and remaining carrier gas are selected from the group consisting of calcium oxide, calcium hydroxide, sodium hydroxide, sodium carbonate, magnesium oxide, ammonium hydroxide and potassium permanganate.

23. The process described in claim 21 in which the alkaline reagent injected into the central portion of the turbulent mixture in said mixing tube comprises a mixture of calcium hydroxide and sodium hydroxide and in which the alkaline reagent injected into the central portion of said turbulent mixture of steam and remaining carrier gas comprises potassium permanganate.

24. The process described in claim 11 which includes further treating said remainder of said carrier gas to remove additional sulfur dioxide by driving said carrier gas with a steam jet ejector utilizing saturated steam as the driving fluid, forming a turbulent mixture of steam and carrier gas by expanding the saturated steam through the nozzle of the steam ejector, injecting a second alkaline reagent into the central portion of the turbulent mixture of steam and gas, further mixing said second alkaline reagent and the sulfur dioxide-containing gas by the continued expansion of the steam driving fluid to cause reaction of the remaining gaseous sulfur dioxide with said second alkaline reagent to form and to promote the growth in size of a second group of aqueous droplets of sulfur-containing reaction products, separating said second group of droplets from the now-remaining carrier gas, and condensing the remaining condensible vapors in a steam condenser.

25. The process described in claim 24 in which the alkaline reagents utilized to condition the carrier gases and injected into the central portion of the turbulent mixture in said mixing tube and into the central portion of said turbulent mixture of steam and remaining carrier gas are selected from the group consisting of calcium oxide, calcium hydroxide, sodium hydroxide, sodium carbonate, magnesium oxide, ammonium hydroxide and potassium permanganate.

26. The process described in claim 24 in which the alkaline reagent utilized to condition the carrier gases is calcium hydroxide and the alkaline reagent injected into the central portion of the turbulent mixture in said mixing tube comprises a mixture of calcium hydroxide and sodium hydroxide and in which the alkaline reagent injected into the central portion of said turbulent mixture of steam and remaining carrier gas comprises potassium permanganate.

* * * * *

UNITED STATES PATENT OFFICE
CERTIFICATE OF CORRECTION

Patent No. 3,852,408            Dated  December 3, 1974

Inventor(s)  Thomas K. Ewan, et al.

It is certified that error appears in the above-identified patent and that said Letters Patent are hereby corrected as shown below:

| | |
|---|---|
| Column 4, line 30 | before "in" insert --as-- |
| Column 8, line 50 | "4" should be --.4-- |
| Column 10, line 13 | "Na" first occurrence should be --Na$_2$-- |
| Column 10, line 58 | "HCO$_3$)$_2$" should be --Ca (HCO$_3$)$_2$-- |
| Column 10, line 64 | "(95)" should be --(5)-- |
| Column 10, line 64 | before "of" insert --existence-- |
| Column 12, line 8 | before "duct" insert --inlet-- |
| Column 21, line 15 | Table VIII first column, third item "12-1" should be --23-1-- |
| Column 21, line 15 | Table VIII between 2nd and 3rd columns delete "607686" |
| Column 21, line 25 | Item 3 under Notes delete "NaOH", second occurrence |
| Column 25, line 51 | "retain" should be --remain-- |

Signed and sealed this 1st day of July 1975.

(SEAL)
Attest:

RUTH C. MASON
Attesting Officer

C. MARSHALL DANN
Commissioner of Patents
and Trademarks